United States Patent
Keller et al.

(10) Patent No.: US 9,683,546 B1
(45) Date of Patent: Jun. 20, 2017

(54) MODULAR SYSTEMS AND METHODS FOR TRANSPORTING TOWER ASSEMBLY OF WIND TURBINE

(71) Applicant: UTC OVERSEAS, INC., Houston, TX (US)

(72) Inventors: Evan Keller, Houston, TX (US); Marco A. Poisler, Houston, TX (US); Joseph M. Sindelar, Houston, TX (US)

(73) Assignee: UTC Overseas, Inc., Houston, TX (US)

( * ) Notice: Subject to any disclaimer, the term of this patent is extended or adjusted under 35 U.S.C. 154(b) by 0 days.

(21) Appl. No.: 15/057,765

(22) Filed: Mar. 1, 2016

Related U.S. Application Data

(60) Provisional application No. 62/261,183, filed on Nov. 30, 2015.

(51) Int. Cl.
  *B60P 3/40* (2006.01)
  *F03D 1/00* (2006.01)
  *B61D 3/16* (2006.01)
  *B65G 67/12* (2006.01)

(52) U.S. Cl.
  CPC ............ *F03D 1/005* (2013.01); *B61D 3/166* (2013.01); *B65G 67/12* (2013.01)

(58) Field of Classification Search
  CPC ...... B60P 3/40; B60P 3/41; B60P 7/12; F03D 1/005; B61D 45/003
  USPC ....................... 410/44, 45, 36, 42, 47, 49, 50
  See application file for complete search history.

(56) References Cited

U.S. PATENT DOCUMENTS

| | | | | |
|---|---|---|---|---|
| 600,428 A | * | 3/1898 | Ladd et al. | B61D 45/003 105/385 |
| 751,366 A | * | 2/1904 | Abernathy | B61D 45/003 105/385 |
| 901,815 A | * | 10/1908 | McConnell | B61D 45/003 105/385 |

(Continued)

FOREIGN PATENT DOCUMENTS

| | | | |
|---|---|---|---|
| DE | 3514975 A1 * | 10/1986 | B60P 3/035 |
| DE | EP 2206627 A2 * | 7/2010 | B60P 7/12 |

(Continued)

OTHER PUBLICATIONS

AIMU Techical Services Committee, "Wind Turbine Paper," Jan. 2012.

(Continued)

*Primary Examiner* — H Gutman
(74) *Attorney, Agent, or Firm* — Blank Rome LLP

(57) ABSTRACT

A system and method are used for transporting a plurality of tower sections of a wind turbine on beds of transport devices, such as flat railcars. Supports affix at support locations on beds to accommodate at least one of the tower sections on each of the transport devices. The supports can include bed supports, such as tabs, extending from the beds, and can include cradle supports with slots that engage on the tabs. A circumferential dimension of a cradle is adjusted on each of the supports against which the tower section rests. Each of the tower sections is then supported with at least two of the supports by loading the tower sections on the transport devices. An end of each of the tower sections is then affixed to a flange on at least one of the supports on each of the transport devices.

31 Claims, 20 Drawing Sheets

(56) References Cited

U.S. PATENT DOCUMENTS

| | | | | |
|---|---|---|---|---|
| 1,020,012 | A | * | 3/1912 | Anlauf ................. B61D 45/003 105/385 |
| 2,611,495 | A | * | 9/1952 | Weaver ................. B65D 71/70 248/146 |
| 3,001,679 | A | * | 9/1961 | Canning ............... B60P 3/1008 224/322 |
| 3,018,129 | A | * | 1/1962 | Culver .................... F41A 9/87 410/44 |
| 3,061,255 | A | * | 10/1962 | Gallo ................... B61D 45/003 410/48 |
| 3,232,636 | A | * | 2/1966 | Buchanan ................. B60P 3/41 105/380 |
| 3,299,989 | A | * | 1/1967 | Santosuosso ............ B60P 7/12 410/42 |
| 3,387,813 | A | * | 6/1968 | Carino .................... B60P 7/12 211/162 |
| 3,922,004 | A | * | 11/1975 | Chamberlain .......... B60P 3/035 410/49 |
| 4,102,274 | A | * | 7/1978 | Feary ...................... B60P 7/12 410/102 |
| 4,106,735 | A | * | 8/1978 | Partain .................... B60P 7/12 211/43 |
| 4,653,967 | A | * | 3/1987 | Isaksson .............. B61D 45/003 188/32 |
| 4,732,528 | A | * | 3/1988 | Good ..................... B65D 19/44 108/53.1 |
| 5,193,700 | A | * | 3/1993 | Lyman ................... B65D 19/44 206/386 |
| 5,888,039 | A | * | 3/1999 | Cooley .................... B60P 7/12 410/36 |
| 5,947,665 | A | | 9/1999 | Baur et al. |
| 6,113,326 | A | * | 9/2000 | Nicholson ............... B60P 3/062 410/19 |
| 6,286,435 | B1 | * | 9/2001 | Kassab .................... B61D 3/16 105/171 |
| 7,210,882 | B2 | | 5/2007 | Andersen et al. |
| 7,591,621 | B1 | | 9/2009 | Landrum et al. |
| 8,382,407 | B1 | | 2/2013 | Landrum et al. |
| 8,491,239 | B2 | * | 7/2013 | Ferrari ..................... B60P 7/12 410/30 |
| 8,500,378 | B1 | * | 8/2013 | Landrum ............... B61D 3/166 410/44 |
| 8,506,218 | B2 | | 8/2013 | Delgado Matarranz et al. |
| 8,529,174 | B1 | | 9/2013 | Landrum |
| 8,708,625 | B1 | | 4/2014 | Landrum et al. |
| 2005/0002749 | A1 | | 1/2005 | Andersen et al. |
| 2007/0036627 | A1 | | 2/2007 | Wright et al. |
| 2011/0097171 | A1 | | 4/2011 | Landrum et al. |
| 2011/0176904 | A1 | | 7/2011 | Stiesdal |

FOREIGN PATENT DOCUMENTS

| | | | | |
|---|---|---|---|---|
| DE | 102012221937 | A1 | * 6/2013 | ................ B60P 3/40 |
| DE | EP 2626547 | A1 | * 8/2013 | ............ F03D 1/005 |
| DK | WO 2012003831 | A2 | * 1/2012 | ............ F03D 1/005 |
| DK | WO 2014111093 | A1 | * 7/2014 | ............ B61D 3/005 |
| EP | 318960 | A1 | * 6/1989 | |
| EP | 382587 | A1 | 8/1990 | |
| FR | 2913380 | A1 | * 9/2008 | ................ B60P 7/12 |
| JP | 4999116 | B2 | * 8/2012 | ............ F03D 1/005 |
| NO | DE 202014000615 | U1 | * 7/2014 | ............ F03D 1/005 |
| TW | DE 202011003305 | U1 | * 9/2011 | ................ B60P 7/12 |
| WO | 2015/101375 | A1 | 7/2015 | |

OTHER PUBLICATIONS

BNSF Railway, "Wind Power Shipments on the BNSF Network," Brochure, Dec. 2015.

Int'l Search Report and Written Opinion in counterpart PCT Appl. PCT/US20161064011, mailed Feb. 2, 2017, 7-pgs.

\* cited by examiner

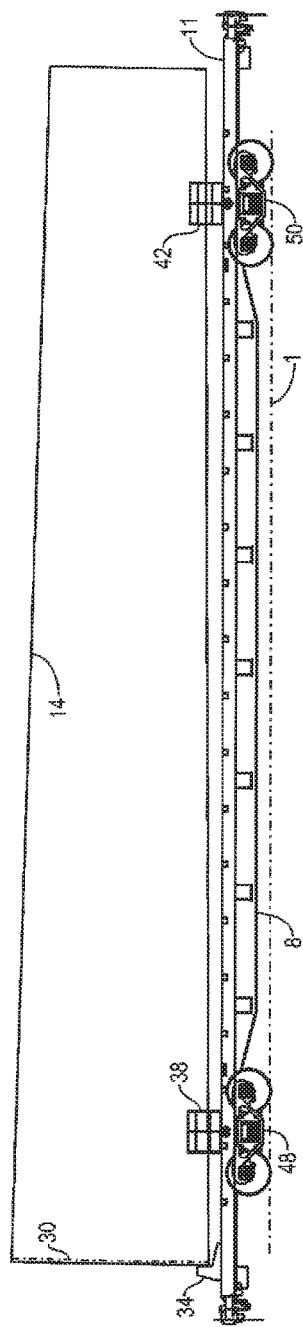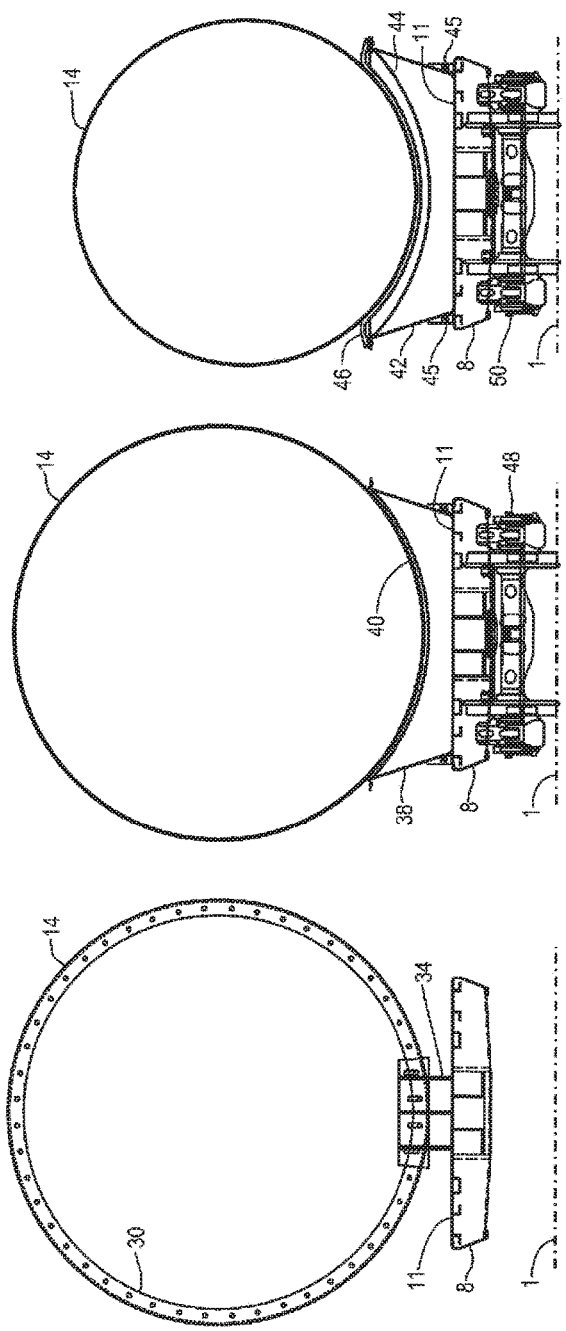

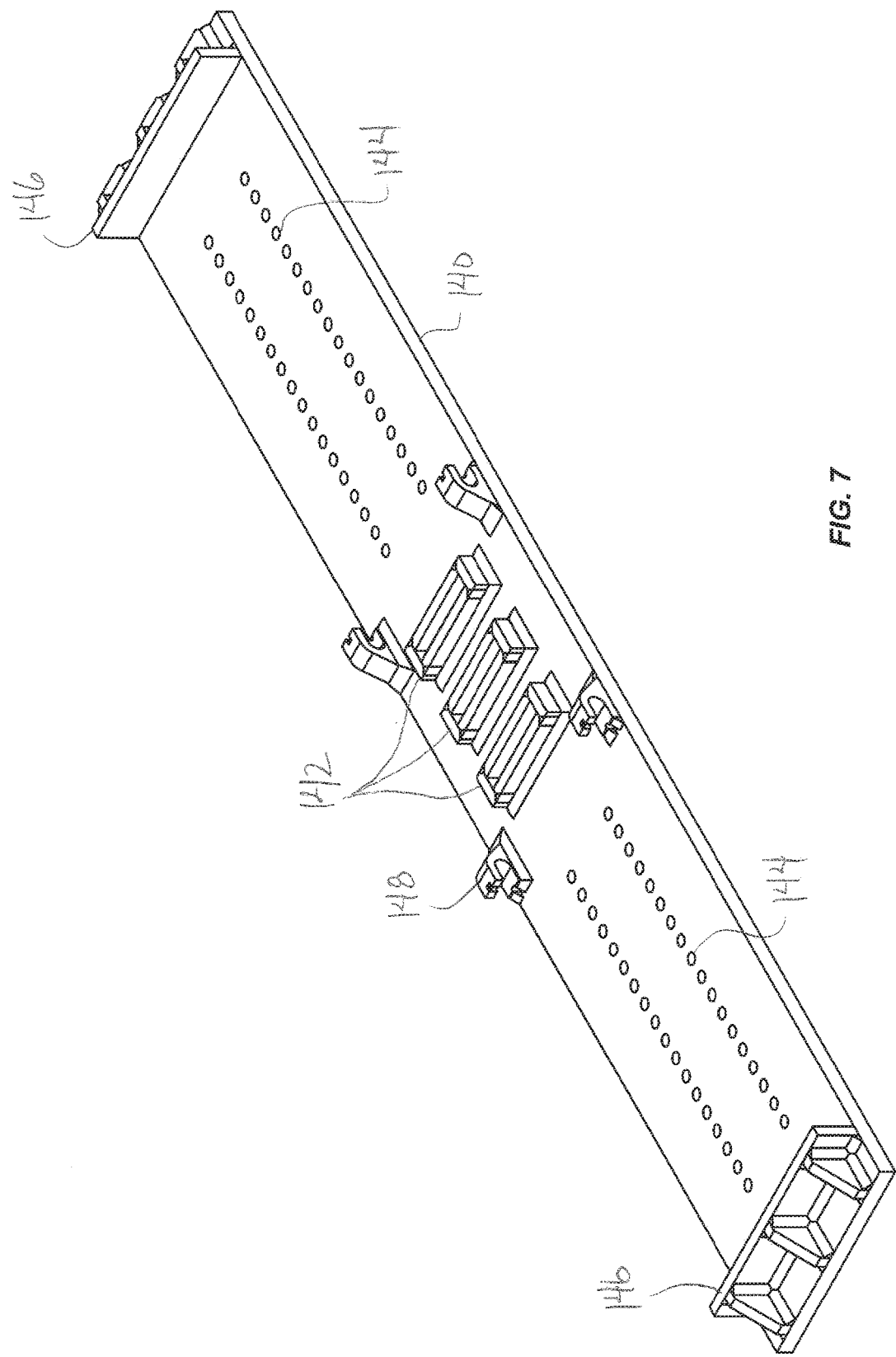

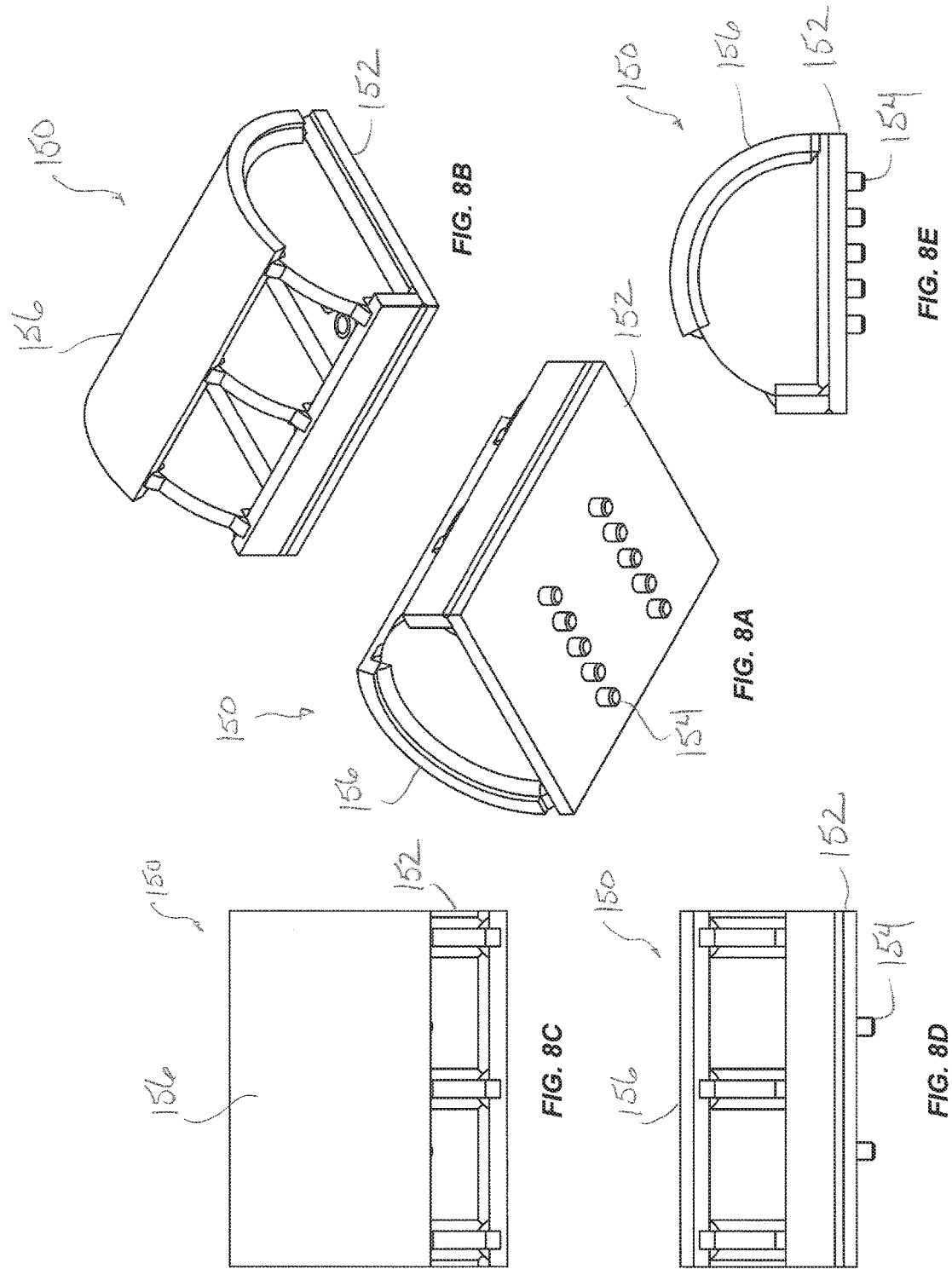

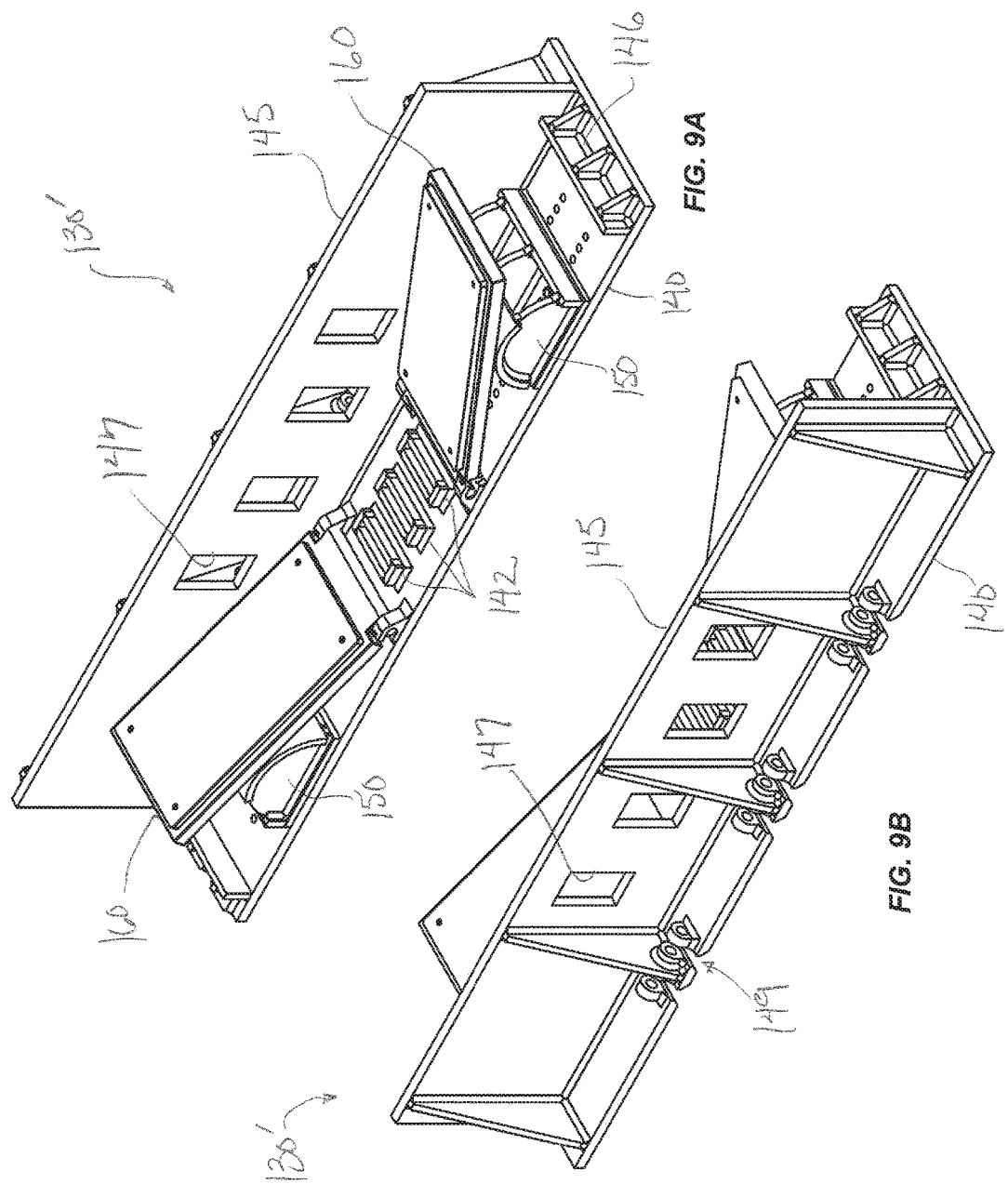

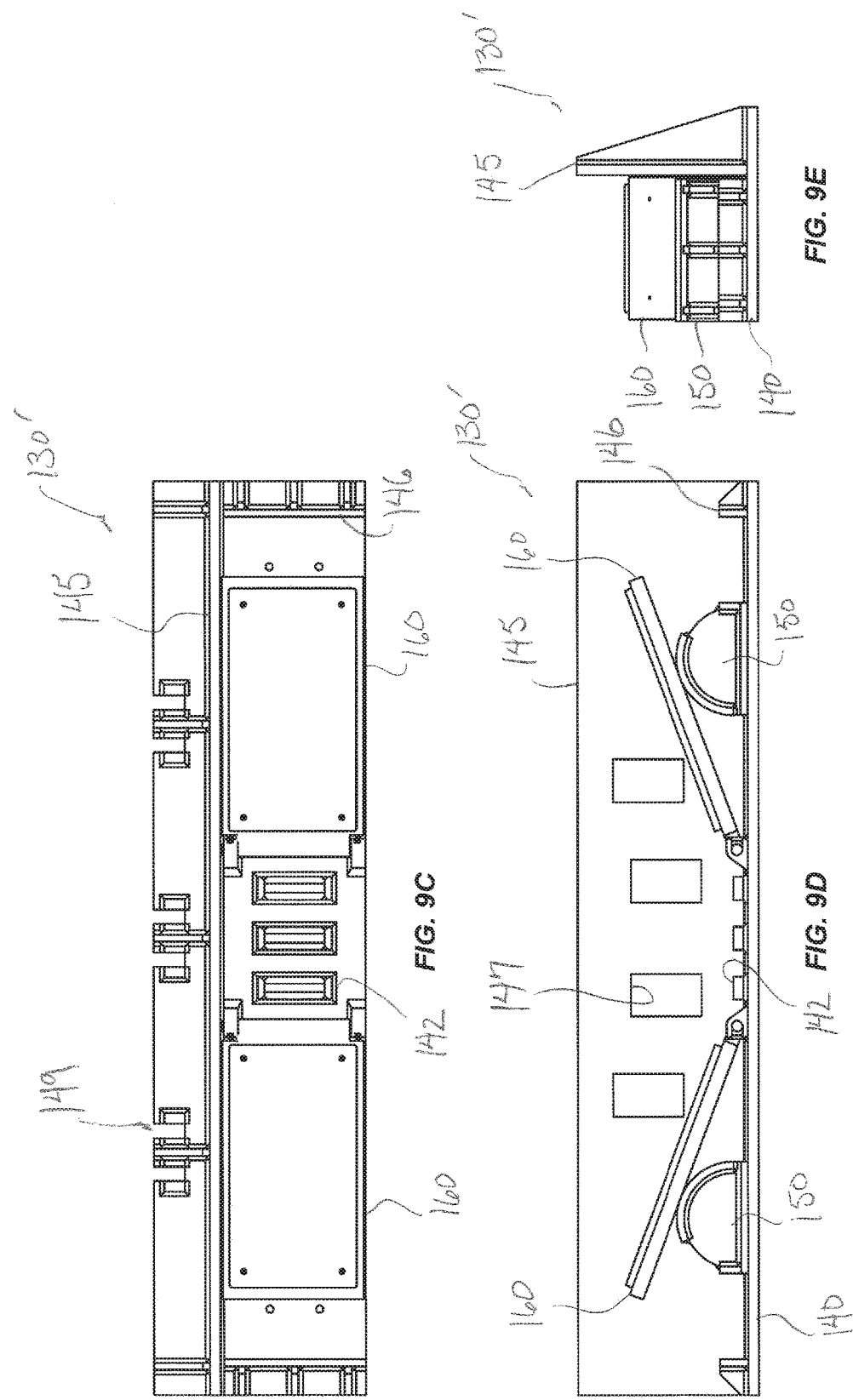

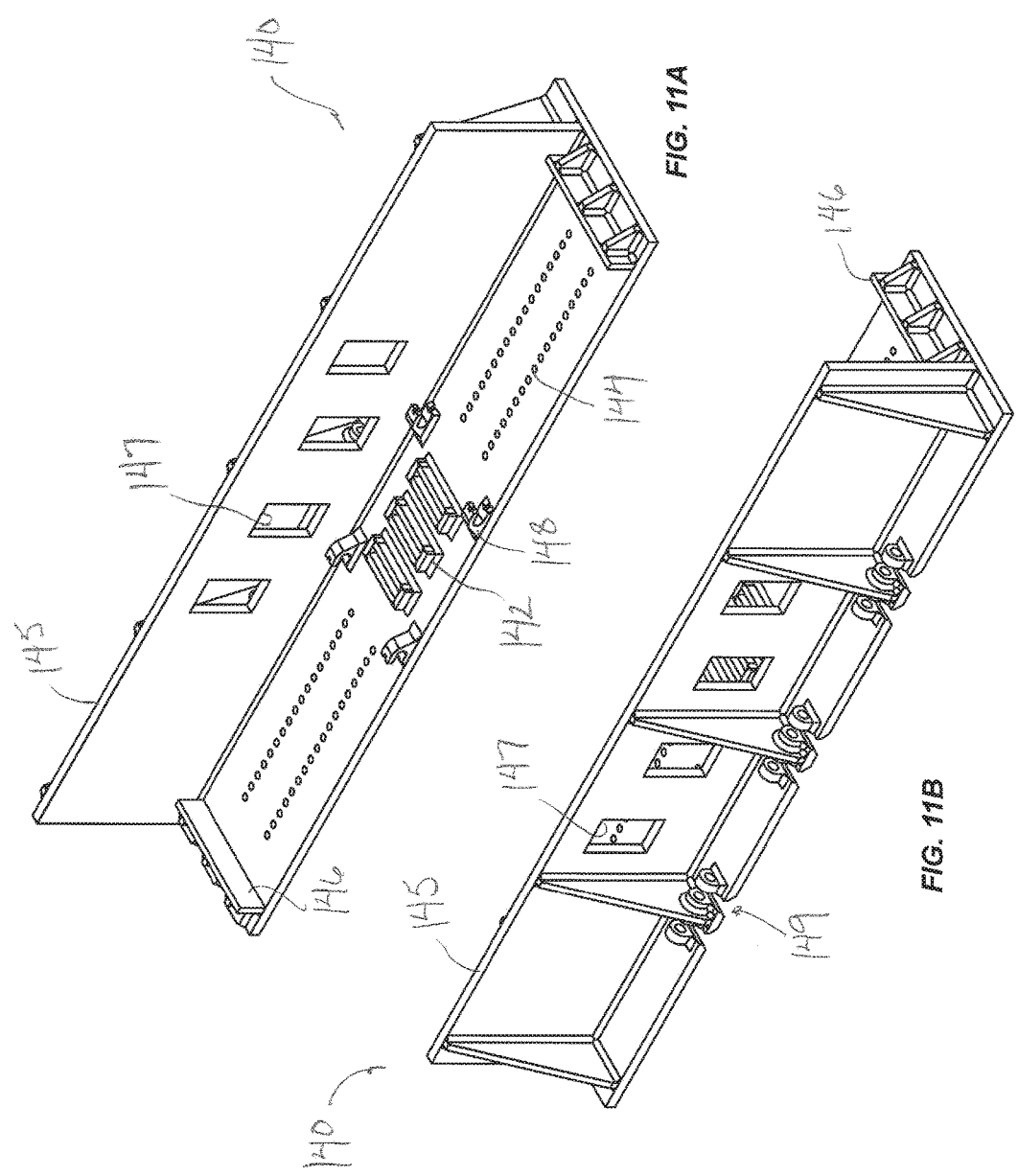

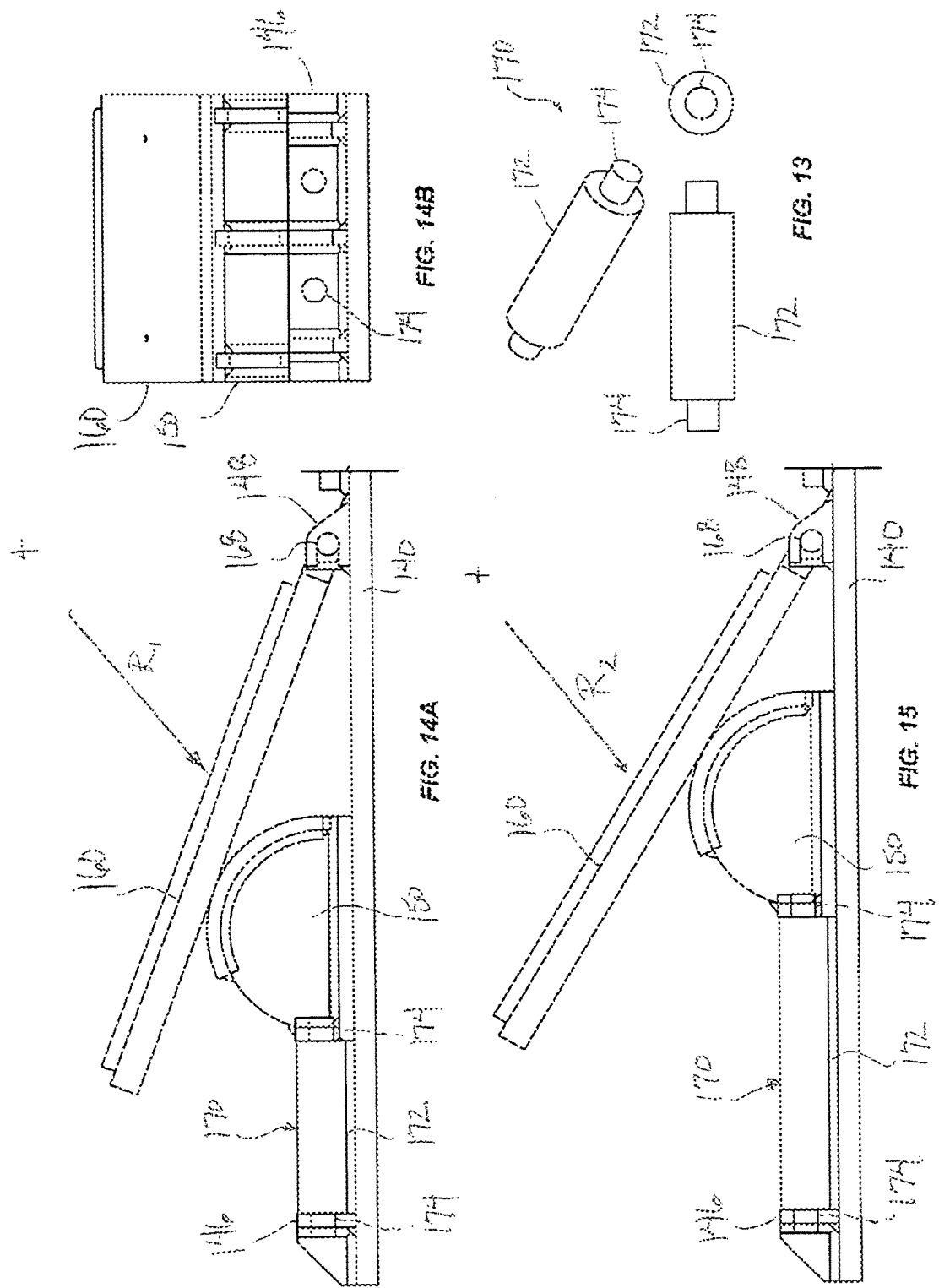

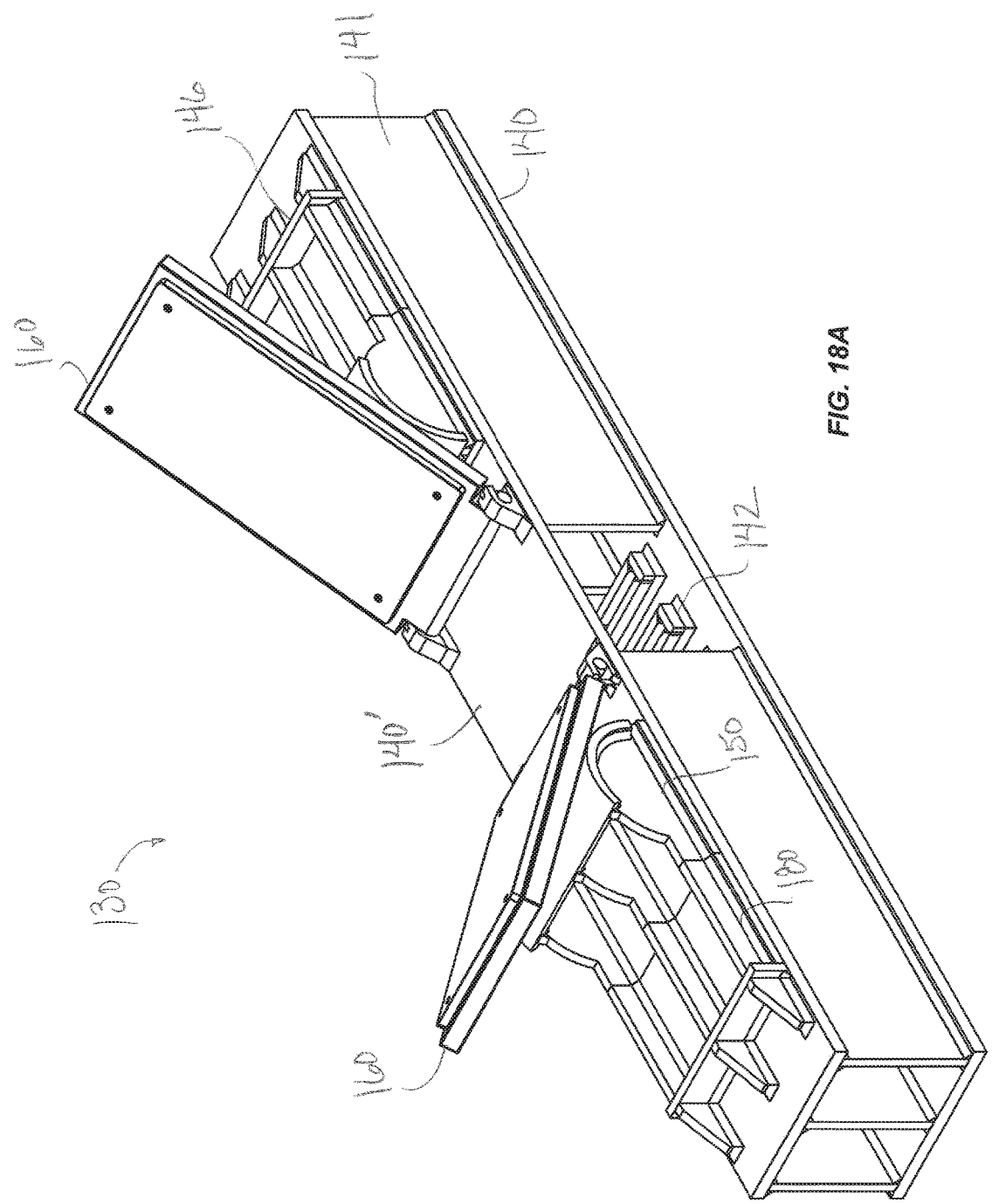

MODULAR SYSTEMS AND METHODS FOR TRANSPORTING TOWER ASSEMBLY OF WIND TURBINE

CROSS-REFERENCE TO RELATED APPLICATIONS

This application claims the benefit of U.S. Provisional Appl. 62/261,183, filed 30, Nov. 2015, which is incorporated by reference.

FIELD OF THE DISCLOSURE

The subject matter of the present disclosure relates to systems and methods for transporting cylindrical tower sections, such used for commercial wind turbines, using one or more railcars or other transport devices.

BACKGROUND OF THE DISCLOSURE

Wind turbines, such as Horizontal Axis Wind Turbines, for generating electrical power have towers that support a nacelle at its top end. A rotor extends from the nacelle and has turbine blades. During operation, prevailing winds cause the turbine blades to rotate the rotor, which is coupled to a generator within the nacelle to produce electricity. To orient the blades, the nacelle can turn about the vertical axis of the tower.

The tower can be any acceptable height. However, the power generation capacity of a wind turbine is directly related to how long the turbine blades are. The length of the turbine blades in turn dictates the required height of the tower. In some large-scale installations, the blades can be about 45-meters long, and the tower can be as much as 90-meters high. Generally, the tower tapers from its base to its top end, which still provides the required strength but with reduced material and fabrication costs. Due to their overall height, the tower is manufactured and transported in a number of tower sections that assemble together at the installation site.

As will be appreciated, the different components of the wind turbine are separately manufactured, sometimes at different locations, and are then transported in pieces to the desired site where they are assembled. Because the components are manufactured in many different places, a number of various forms of transportation must be used, including ships, barges, trains, and trucks.

The sheer size of the various components complicates the transportation. Additionally, the components must be protected and handled properly during transportation to prevent damage. Moreover, the components in many cases must be switched from one mode of transport to another mode during the overall stages of the journey. In the end, it will be appreciated that the logistics to move the various components from the point of manufacture to the ultimate installation site can be complicated, expensive, and time consuming.

Each mode of transport presents challenges to transporting the tower sections. In particular, the profile for railroad transport can be tightly limited because the trains must traverse curved sections and complex rail yards. Mounting fixtures are used to fix the tower sections to railcars during transport.

A particular example of mounting fixtures for fixing tower sections is disclosed in U.S. Pat. No. 8,529,174. Reproduced here in FIG. 1, a train 2 is shown for transporting a three-section tower assembly via rail 1 according to the prior art. The train 2 has three railroad flatcars 4, 6, and 8 traversing the rail 1, and the tower assembly has three tower sections, which include a base tower section 12, a middle tower section 14, and a top tower section 10—each tapering from the base to the top. The base tower section 12 is loaded onto a center flatcar 6 and is disposed toward one end of the flatcar 6, clearing an open area at the opposite end of the flatcar 6. The middle tower section 14 is loaded onto another flatcar 8 and has a length that takes up most of the length of the flatcar 8. The top tower section 10 is loaded onto yet another flatcar 4. The length of the top tower section 10 is longer than the length of the flatcar 4 so that one end of the section 10 extends over the next coupled flatcar 6.

Each of the tower sections 10, 12, 14 is supported on the flatcars 4, 6, and 8 using saddle assemblies. Looking in particular at how the middle tower section 14 is supported on the flatcar 8, reference is directed to FIG. 2A. The flatcar 8 is a conventional 90-foot flatcar with a pair of conventional bolsters 48, 50, and a load deck 11. In this example, the tower section 14 has a length approximately as long as the flatcar's deck 11. The middle tower section 14 includes an internal flange 30 on its larger circumference end for engaging the base tower section (12) when the tower is finally assembled. The flange 30 is also used as an attachment point for a stop 34 disposed between the deck 11 of the flatcar 8 and the tower section 14 during transit. The stop 34 retains the tower section 14 against longitudinal movement with respect to the flatcar 8. To a lesser extent, the stop 34 also retains the tower section 14 against lateral movement.

The primary lateral support is by saddles assemblies 38, 42. The weight of the tower section 14 is supported by a first saddle assembly 38 located over the bolster 48, and a second saddle assembly 42 located over the other bolster 50. The second saddle assembly 42 also includes a spacer assembly 44.

The sectional view of FIG. 2B is taken at the location of the flange 30 on the end of tower section 14. Plural connecting bolts join the flange 30 to the stop 34, which has previously been fixed to the deck 11, such as by welding or other suitable means. As illustrated, the stop 34 is comprised of an attachment plate bolted to the flange 30, and of plural gusset plates welded to the attachment plate and the deck 11 of the flatcar 8.

The sectional view of FIG. 2C is taken at the position of the bolster 48 of the flatcar 8 where the saddle assembly 38 is situated. The saddle assembly 38 is fixed to the deck 11 of the flatcar 14. The upper surface of the saddle assembly 38 is a saddle that conforms to the shape of the tower section 14 at a location along the elongated portion of the tower section at which the saddles assembly 38 engages. Because the tower 14 is circular in cross section, the saddle assembly 38 is an arcuate circular section, conforming to the exterior shape of the tower section 14. A resilient saddle liner 40 is disposed between saddle assembly 38 and the surface of the tower section 14 to protect the surface finish of the tower section 14 and to accommodate small variances between the two surface shapes.

The sectional view of FIG. 2D is taken at the location of the other bolster 50, which is also the location of the other saddle assembly 42. This saddle assembly 42 is substantially the same as saddle assembly 38. To accommodate different sizes and shapes of the tower cross sections, a spacer assembly 44 is positioned on top of saddle assembly 42 and adapts the conformal shape of the saddle assembly 42 to the exterior shape of the tower section 14 at the location of support of saddle assembly 42. Because the tower section 14 has a smaller diameter at the location of saddle assembly 42, the spacer assembly 44 presents a correspondingly smaller diameter spacer saddle profile. A resilient liner 46 is disposed between the spacer assembly saddle 44 and the tower 14. Also, the saddle assembly 42 is fixed to the deck 11 of the flatcar 8 using pins disposed between fixed deck brackets and gussets on the saddle assembly.

Although current techniques are available for transporting tower sections on a railcar, such as disclosed in U.S. Pat. No. 8,529,174, transportation personnel are continually seeking more versatile and useful ways to transport large cylindrical objects.

SUMMARY OF THE DISCLOSURE

According to the present disclosure, a modular system is used for transporting a plurality of cylindrical items, such as sections of a tower assembly for a wind turbine. The system includes a plurality of transport devices and a plurality of support members. The transport devices each have a bed with a plurality of support locations thereon. Each of the transport devices accommodates one of the tower sections thereon.

The support members are each positionable at one of the support locations to support the cylindrical items (e.g., tower sections) on the beds of the transport devices. Each of the support members have a cradle surface against which the tower section is rests. The cradle surfaces are adjustable on the support member between a plurality of circumferential dimensions. At least one of the support members on each of the transport devices is a foot having a flange affixable to an end of the tower section supported on the bed of the transport device.

The transport device can be a railroad car, such as a flatcar with a bed. The bed can have at least two support locations, such as towards the ends of the bed. Preferably, more than two support locations are provided, especially in intermediate locations on the bed, so the flatcar can accommodate any of the various tower sections.

Each support location can be the same as the others so that the system maintains its modularity. In one arrangement, the support locations include a number of inner tabs or clips in the bed of the flatcar. The support locations can also include outer tabs or clips affixed to the bed of the flatcar. The outer tabs are used for affixing the feet in place. The inner tabs are used for holding the support members laterally and longitudinally on the bed of the flatcar. The weight of the cylindrical tower sections may be all that is need to hold the support members against the surface of the flatcar's bed.

The modular system is a fixture and securement system that can be readily adjustable to fit a range of configurations. No welding is required for the adjustment from one tower section to another. The system reduces overall costs by reducing the number of railcars need for transport and eliminating dwell time of the railcars when being prepared, loaded, and unloaded.

The adjustable fixtures accommodate multiple tower sizes, weights, and centers of gravity. One-time set up is needed for preparing the flatcars, and there is no need for welding once the flatcar is set up. Accordingly, installation field personnel can adjust the modular components of the system as needed. For example, a method of the present disclosure can involve: adjusting a circumferential dimension of a cradle on each support against which a tower section rests; adjusting a height of a base supporting a hinge, the cradle surface, and a saddle above a bed of the transport device; changing a position of a saddle on the base; engaging a plurality of tabs and slots on the base and the saddle with one another to hold the saddle in position on the base; positioning one or more spacers between an edge of the base and the saddle to hold the saddle in position on the base; and selecting from a plurality of the spacers of different lengths for adjusting the position of the saddle on the base.

The foregoing summary is not intended to summarize each potential embodiment or every aspect of the present disclosure.

BRIEF DESCRIPTION OF THE DRAWINGS

FIG. 2A illustrates a side view of one of the tower sections in FIG. 1 loaded on a railcar according to the prior art.

FIGS. 2B-2D illustrate sectional views of the tower section loaded on the railcar in FIG. 2A.

FIG. 7 illustrates an isolated view of the base for the disclosed cradle.

FIGS. 8A-8E illustrate various views of a saddle for the disclosed cradle.

FIGS. 9A-9E illustrate various views of a foot of the disclosed modular assembly.

FIGS. 11A-11B illustrate perspective views of a base for the disclosed foot.

FIG. 13 illustrates views of one type of spacer for the saddle on the base of a cradle or foot.

FIGS. 14A-14B illustrate side and end views of a portion of a cradle with first spacers for the saddle.

FIG. 15 illustrates a side view of a portion of a cradle with second spacers for the saddle.

FIG. 18A-18D illustrate perspective, plan, side, and end views of an elevated cradle of the disclosed modular assembly.

DETAILED DESCRIPTION OF THE DISCLOSURE

Figure 1:
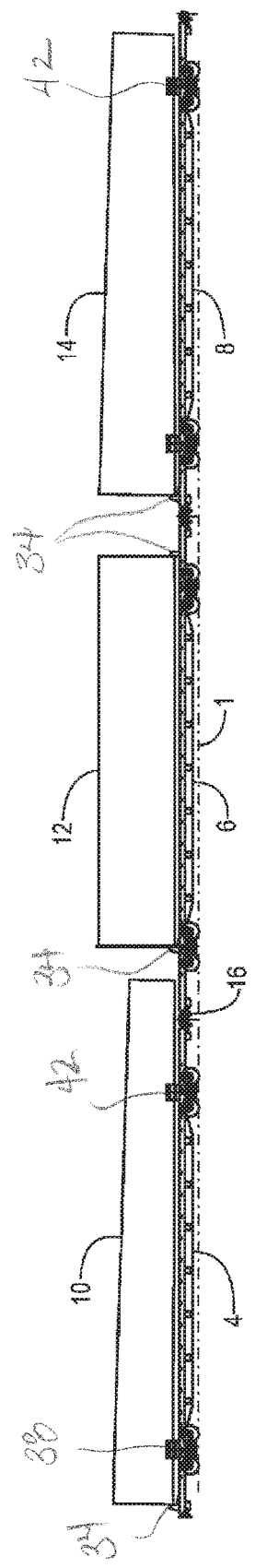
FIG. 1 illustrates an example of a train carrying three tower sections according to the prior art.
Figure 3:
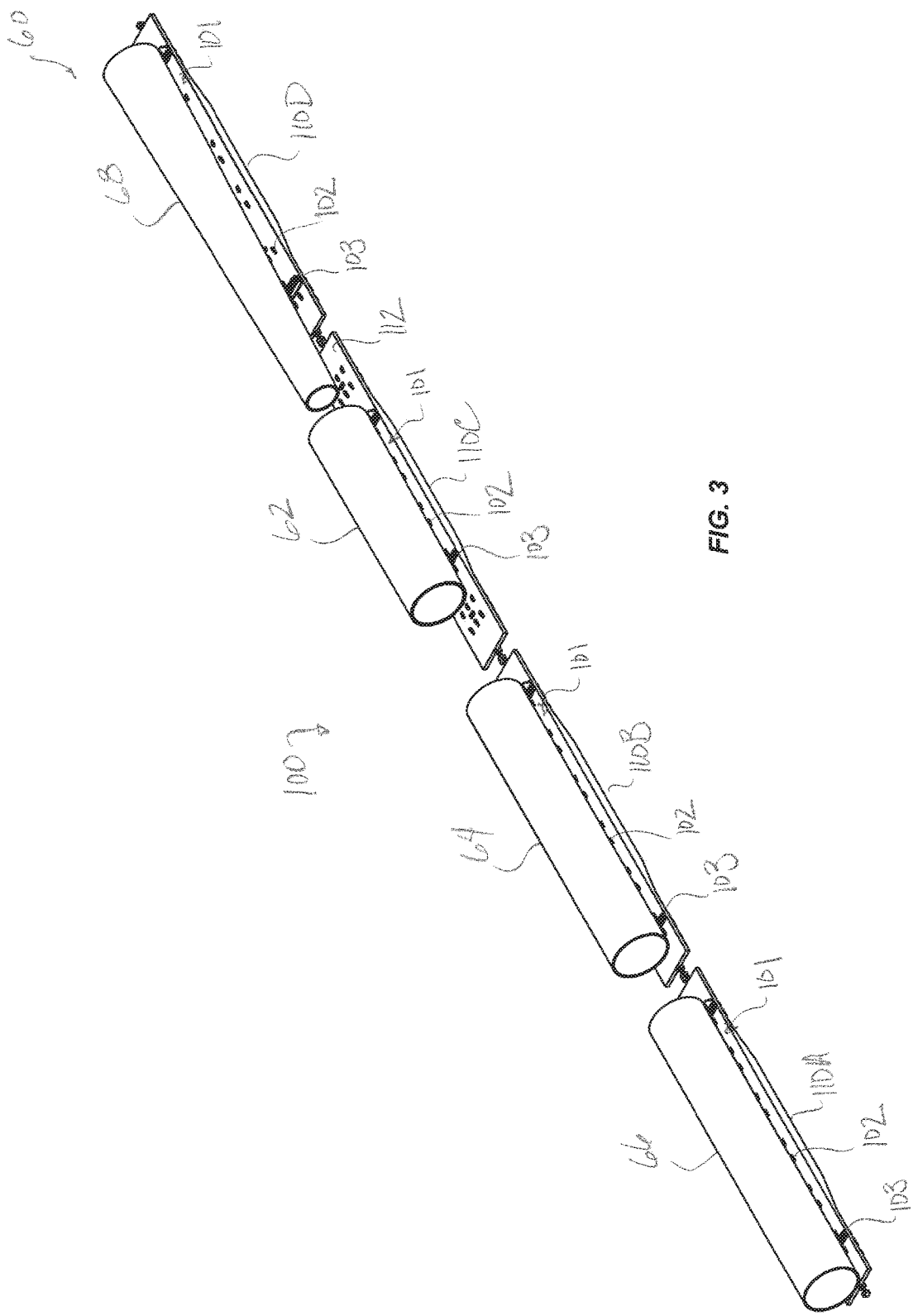
FIG. 3 illustrates an example of a modular assembly according to the present disclosure transporting sections of a tower assembly.

Referring to FIG. 3, transport devices 110A-D transport four cylindrical items, namely tower sections 62, 64, 66, and 68 of a tower assembly 60 for a wind turbine. The tower sections 62, 64, 66, and 68 represent a type of heavy-lift and over-dimension cargo, which requires significant coordination and time to transport. Other tower assembles with other numbers of tower sections and lengths can readily be accommodated by the teachings of the present disclosure.

As shown herein FIG. 3, the tower sections 62 . . . 68 can be transported by rail. Transporting the tower assembly 60 requires the right selection of railcars, be they heavy-duty, multi-axle or Schnabel types of railcars. The tower sections 62 . . . 68 can also be transported by road transport using regular, specialized multi-axle, articulated, air ride, or hydraulic heavy haul types of equipment and trucks. Moreover, the tower sections (62 . . . 68) can be transported by vessels, ships, tugs, barges, trucks, trailers, pallets, shipping containers, and the like. The teachings of the present disclosure can therefore apply not only to railcars as shown, but to other transport devices.

Again, the transport devices 110A-D as shown here can be railcars for transporting the tower assembly 60 by rail. The railcars include a first flatcar 110A supporting an upper intermediate tower section 66, a second flatcar 110B supporting a lower intermediate tower sections 64, a third flatcar 110C supporting a base tower section 62, and a fourth flatcar 110D supporting a top tower section 68. As is typical, each of these tower sections 68 taper from its base end to its top end.

The base tower section 62 loaded onto third flatcar 110C does not take up the full length so that clearance is available for an overhang of the top tower section 68 on the following flatcar 110D. The other tower sections 64 and 66 may generally fit the length of their flatcars 110A-B. As will be appreciated, a tower assembly 60 may have more or less sections, and they can be arranged in a different order as the case may be.

A modular assembly 100 supports the tower sections 62, 64, 66, and 68 on the flatcars 110A-D. Each of the flatcars 110A-D can accommodate at least one of the tower sections 62, 64, 66, and 68 thereon using a plurality of supports 101 of the assembly 100. The supports 101 include a plurality of bed supports 102 affixable at support locations on the beds 112 of the flatcars 110A-D. The supports 101 also include a plurality of cradle supports 103 engageable to the bed supports 102. In this way, each of the supports 101 is positionable at one of the support locations in a modular fashion to support the tower sections 62, 64, 66, and 68 on the beds 112 of the flatcars 110A-D.

Each of the cradle supports 103 have an adjustable cradle against which the tower section 62, 64, 66, and 68 rests. The adjustable cradle can be adjusted on each cradle support 103 between a plurality of circumferential dimensions, which can be set to the particular circumference of the tower section 62, 64, 66, and 68 being supported. At least one of the cradle supports 103 on each of the flatcars 110A-D is affixable to an end of the tower section supported on the bed of the flatcar 110A-D.

Figure 4A:
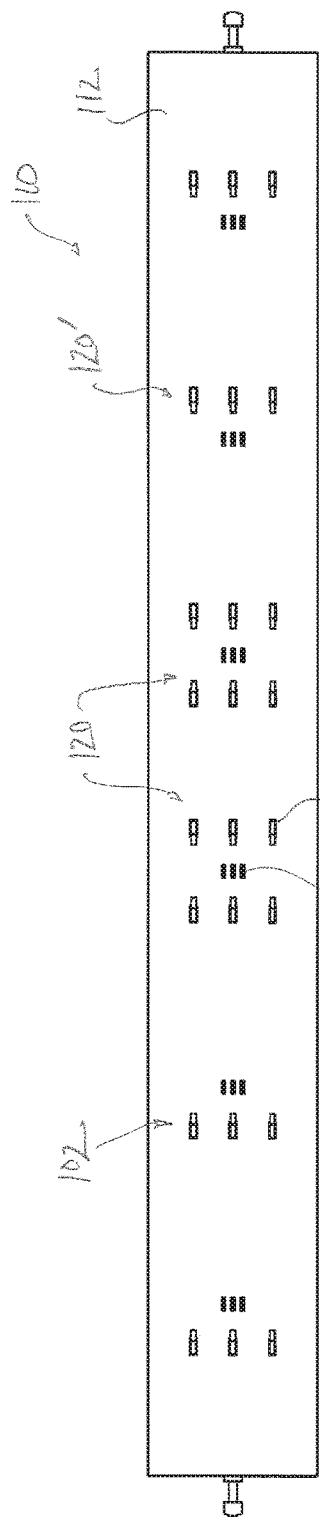
FIGS. 4A-4C illustrate plan, side, and detailed views of a flatcar of the modular assembly.
Figure 4B:
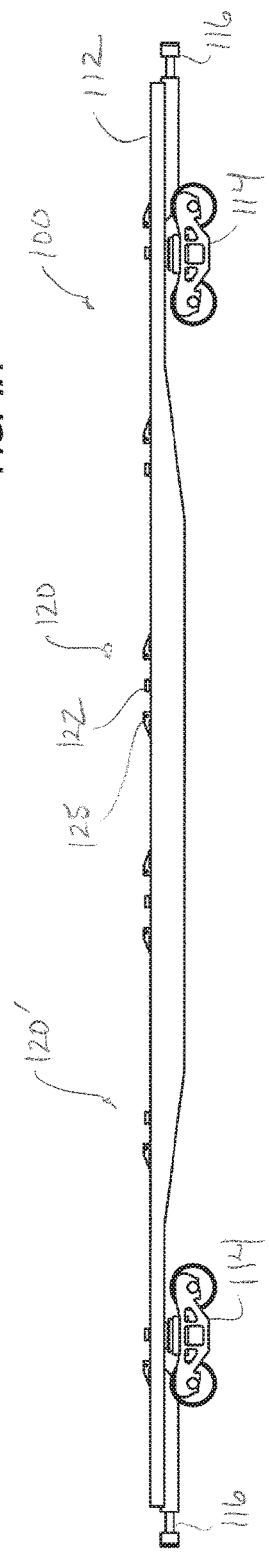

As shown in FIGS. 4A-4B, the bed supports 102 at the support locations include one or more tabs 122, 125 disposed on the bed 112 of the flatcars 110A-D for restraining the cradle supports (103) positionable thereon. The tabs 122, 125 at least laterally and longitudinally restrain the cradle supports 103 on the bed.

The one or more tabs 122, 125 can include one or more inner tabs 122 extending from the bed 112 of the flatcar 110 and positionable in one or more slots of the cradle support (103) positionable on the bed 112 at the support location 120.

The one or more tabs 122, 125 can include one or more outer tabs 125 extending from the bed 112 of the flatcar 110 and positionable adjacent one or more edges of the cradle support (103) positionable on the bed 112 at the support location 120. Depending on the arrangement, at least one of the one or more outer tabs 125 can affix to the at least one of the cradle support (103) that affixes to the end of the tower section (62 . . . 68).

Figure 5:
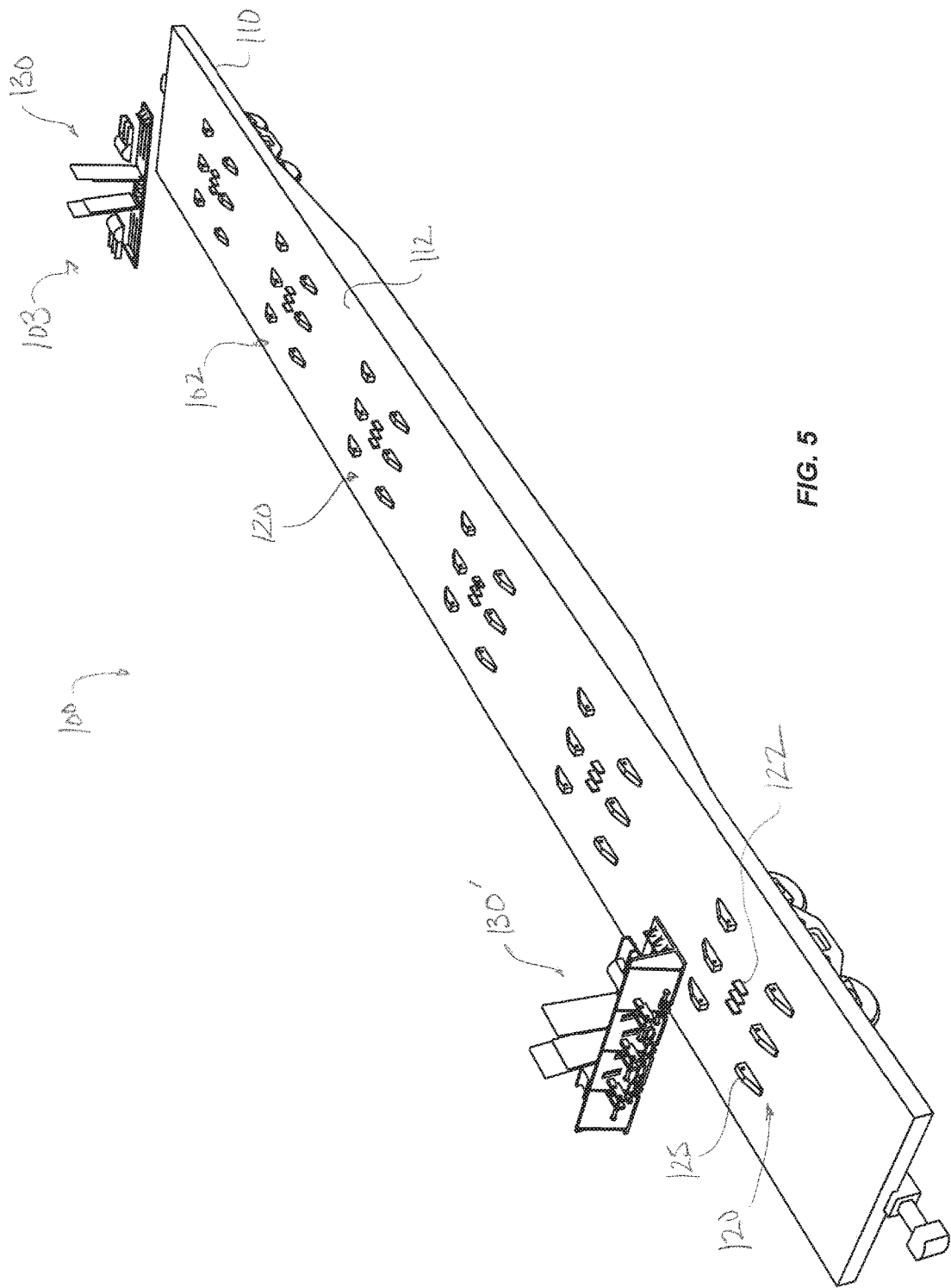
FIG. 5 illustrates a flatcar being fitted with a cradle and a foot of the disclosed modular assembly.

As shown in FIG. 5, for example, each of the tower sections (62 . . . 68) is supported on the flatcars 110A-D using adjustable cradles 130 and feet 130' as the cradle supports (103), which are discussed in more detail below. Additionally, the adjustable cradles 130 and the feet 130' can fit on configured locations 120 on the flatcars 110A-D. In this way, various flatcars 110, cradles 130, and feet 130' can be configured to accommodate various tower sections having different arrangements, tapers, lengths, etc. Lashing using straps or tie downs (not shown) can be further added to the flatcars 110A-D to support the tower sections 62, 64, 66, and 68, but separate lashing may not be necessary. Overall, the modular system 100 preferably meets longitudinal, lateral, and vertical railroad transport requirements.

Figure 4E:
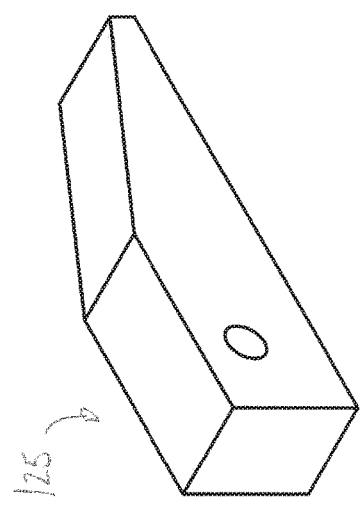
FIG. 4E illustrates an isolated view of an outer clip for the flatcar of the modular assembly.
Figure 4D:
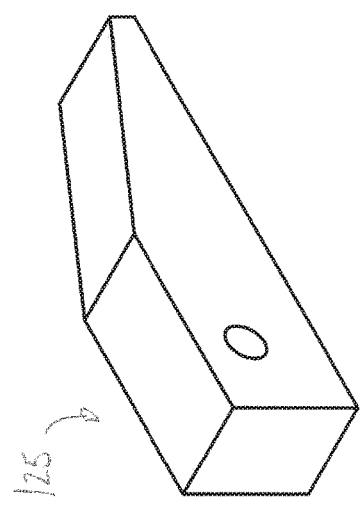
FIG. 4D illustrates an isolated view of an inner clip for the flatcar of the modular assembly.
Figure 4C:
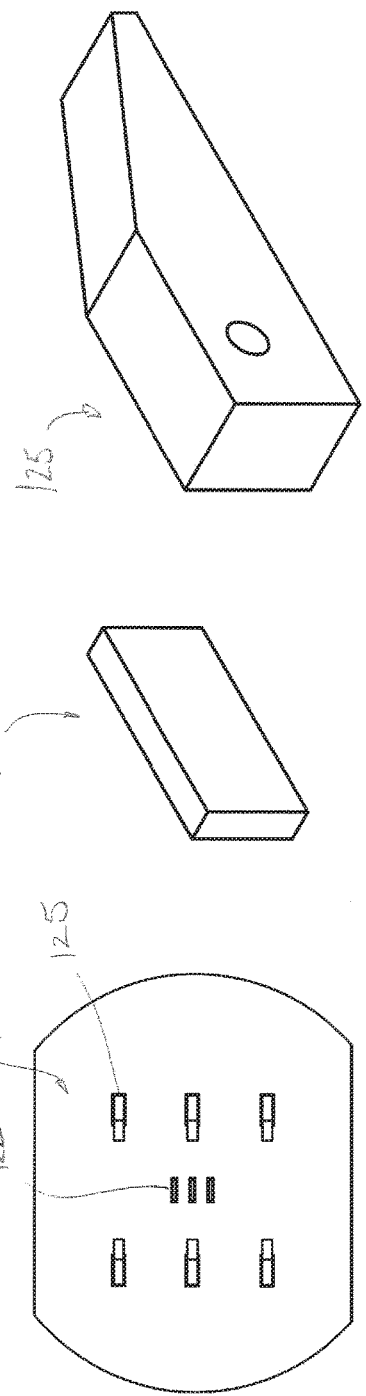

Looking at the configuration of a flatcar 110 in more detail, FIGS. 4A-4C illustrate plan, side, and detailed views of a flatcar 110 of the modular assembly. The flatcar 110 has a bed 112 supported with trucks 114 and having couplings 116. The bed 112 has a number of support locations 120/120', which are the bed supports 102 where a tower section (not shown) can be supported on the bed 112. At least two support locations 120/120' are provided on the bed 112; however, preferably a number of support locations 120/120' are provided so various lengths of tower sections can be supported in different ways on the same flatcar 110. In the particular embodiment shown here, the flatcar's bed 112 has six support locations 120/120'. Although not strictly necessary in all implementations, it may be preferred to locate one or more of the support locations 120/120' over the rail trucks 114 because the weight of supported load (i.e., tower section) may be more directly transferred to the underlying rails.

Each of the support locations 120/120' can be the same, or as specifically shown, different support locations 120/120' can be provided. A universal support location 120 has one or more inner clips 122 disposed between one or more opposing outer clips 125 on both sides. An end support location 120 has one or more inner clips 122 with one or more outer clips 125 only toward the end of the bed 112. In this particular example, two universal support locations 120 are centrally located on the bed 112. Two opposing sets of end support locations 120' are positioned toward the ends of the bed 112. Other configurations can be used.

The flatcar 110 can be prepared ahead of time and can be reused as necessary. In one embodiment, the flatcar 110 can be a four axle, 89' flat deck railcar. As configured, the flatcar 110 has all the prepositioned support locations 120/120' to allow the cradle(s) (130) and the feet (130')' to be moved based on varying lengths of tower sections. In this way, a given tower section sits in the cradle(s) (130) and feet (130'), which can be adjusted for varying diameter sections, and the cradle(s) (130) and feet (130') can be moved to any of the pre-set support locations 120/120' to accommodate various diameters and lengths of tower sections.

In this particular example, a set of three inner clips 122 is used for each support location 120/120'. These inner clips 122 can be welded to the bed 112, can be disposed in configured slots in the bed 112, or can be otherwise affixed in place on the bed 112. For example, the inner clips 122 can be permanently welded to the bed 112 with ⅝" welds using type E70 rods. The outer clips 125 also come in sets of three disposed with wider spacing than the three inner clips 122.

The outer clips 125 can be welded to the bed 112, can be disposed in configured slots in the bed 112, or can be otherwise affixed in place on the bed 112.

FIG. 4D illustrates an isolated view of an inner clip 122. As shown, the inner clip 122 can be a rectangular plate of steel. FIG. 4E illustrates an isolated view of an outer clip 125. As shown, the outer clip 125 can have a straight edge and a ramped edge. A lateral hole is also defined through the side of the outer clip 125. The ramp on the clip 125 may be provided for guiding and placing cradle supports (103), and the lateral hole can be provided for affixing to a cradle supports (103).

As noted above, cradle supports 103 including an adjustable cradle 130 and a foot 130 of the modular assembly 100 support a tower section on a flatcar 110. FIG. 5 illustrates a flatcar 110 being fitted with a cradle 130 and a foot 130' of the disclosed modular assembly 100. The cradle 130 and foot 130' can be positioned at any of the available support locations 120/120', which in this particular example are all the same so the cradle 130 and foot 130' can be placed for the particular size of the tower section to be supported on the bed 112. The foot 130' can be placed either at the lead or tail end of the flatcar 110, but preferably at the tail end to support the following end of the supported tower section. More than one cradle 130 can be used. Also, for some tower sections, two opposing feet 130' can be used at the ends of the tower section. These and other configurations can be used.

The cradle 130 supports the weight of the tower section and is adjustable to the outer dimension on the particular portion resting on the cradle 130 to support the section laterally. The foot 130' also supports the weight of the tower section and is adjustable to the outer dimension on the particular portion resting on the foot 130' to support the section laterally. As already mentioned, the foot 130' also affixes to the end of the tower section to support it longitudinally.

Looking now at the adjustable cradle 130, FIGS. 6A-6D illustrate perspective, plan, side, and end views of a cradle 130 of the disclosed modular assembly. In general, the cradle 130 has a hinge 148 that positions adjacent the bed (112) of the flatcar and supports an end of a cradle surface 160 of the adjustable cradle 130. Additionally, a saddle 150 is positioned between the bed (112) and the cradle surface 160 and is adjustable relative to the hinge 148 to adjust an angle of the cradle surface 160 relative to the bed (112). The hinge and saddle arrangement are mirrored on an opposing side of the cradle 130 so that an opposing angle of another cradle surface 160 can be adjusted relative to the bed (112) in a comparable manner.

As shown here, the hinge 148 is disposed on a base 140 of the cradle 130, and the saddle 150 fits on this base 140. This facilitates the assembly and the modularity of the cradle 130. It is possible for the hinge 148 to be a part of the bed supports (102) mounted directly on the bed (112) of the flatcar, and/or the saddle 150 can likewise rest directly against the bed (112). In this way, the cradle 130 may not require a base 140 because various elements may be made part of the bed supports (102) and vice versa.

Figure 6A:
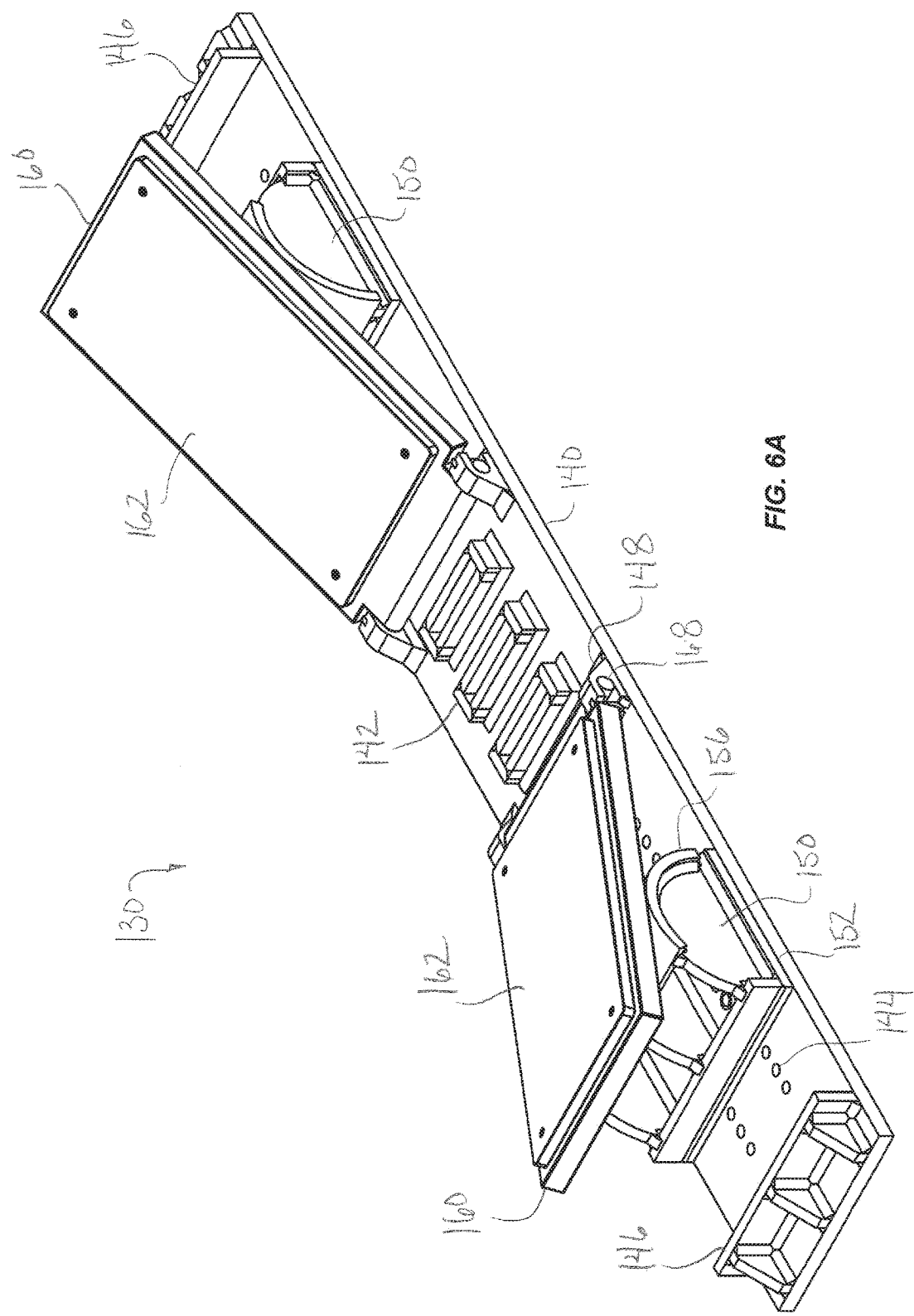
FIGS. 6A-6D illustrate perspective, plan, side, and end views of a cradle of the disclosed modular assembly.
Figure 6D:
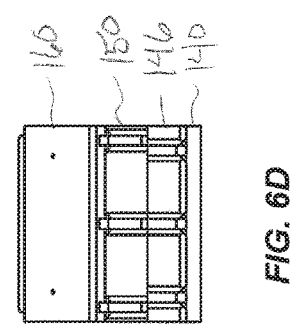
Figure 6B:
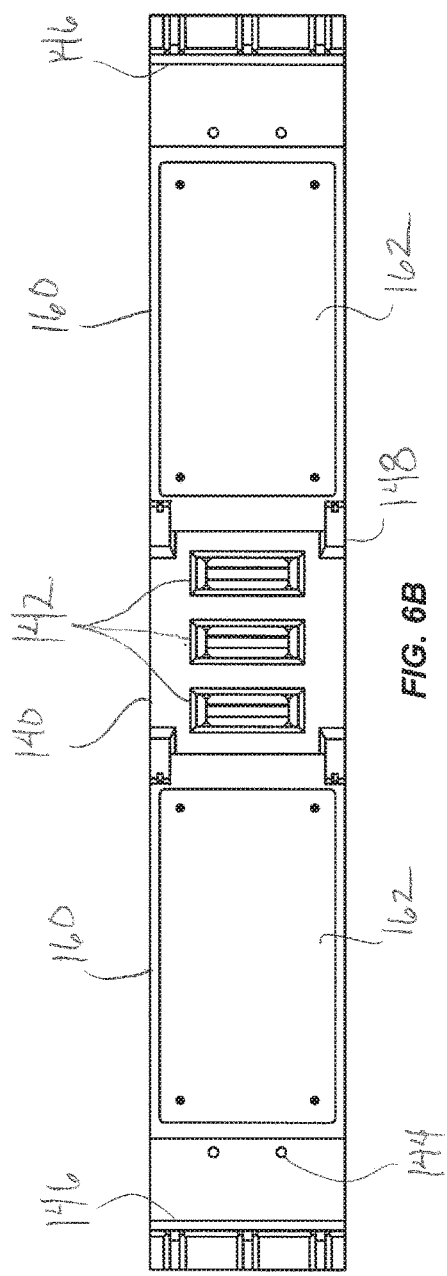
Figure 6C:
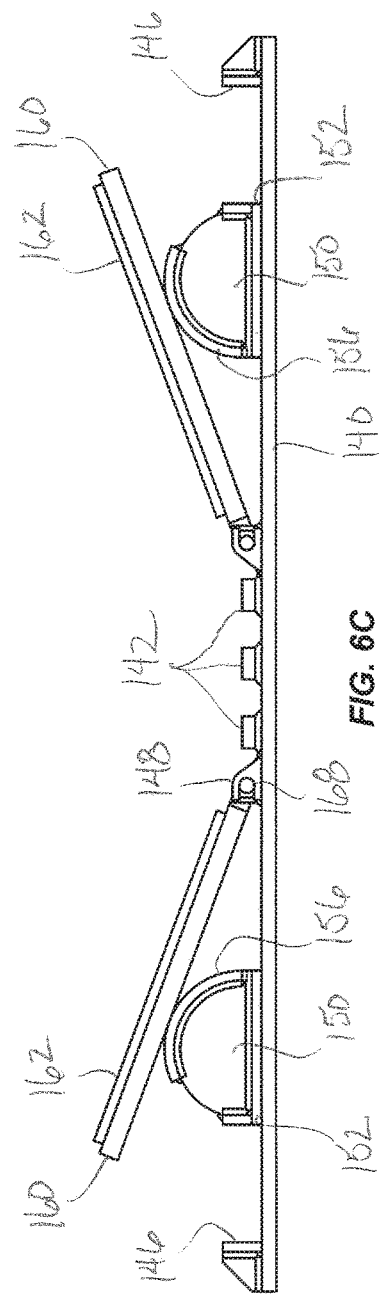

As shown in particular in FIGS. 6A-6B, the cradle 130 has the base 140 that rests against the bed (112) of the flatcar (110). (FIG. 7 illustrates an isolated view of the base 140 for the disclosed cradle 130.) Reinforced slots 142 in the central area of the base 140 fit over the inner clips (122) of a support location (120/120') where the cradle 130 is positioned. As noted above, the cradle 130 is restrained using the internal clips (122). Due to rail requirements, the cradle 130 may or may not need to be bolted, pinned, or the like to the bed (112), such as to the inner clips (122) or to the outer clips (125) as the foot (130) is.

Saddles 150 are positioned on opposing ends of the base 140 and hold up the cradle surfaces 160 pivoted on pivot pins 168 installed in the base hinges 148. (FIGS. 8A-8E illustrate various views of a saddle 150 for the disclosed cradle 130.) The saddle 150 has a bottom surface 152 that sets against the base 140 and has a bearing surface 156 against which the cradle surface 160 rests. The cradle surface 160 can have a pad 162 of protective material, such as rubber, neoprene, or the like, against which the surface of the tower section rests.

In one arrangement, the base 140 and the saddle 150 have a plurality of tabs and slots engageable with one another to hold the saddle 150 in position on the base 140. For example, the saddle 150 can have tabs, the base 140 can have slots, both can have the reverse, or both can each have tabs and slots. As shown in this particular example, the bottom surface 152 of the saddle 150 can have extending features or tabs 154 for adjustably setting in apertures or slots 144 in the surface of the base 140 so that particular placement of the saddle 150 can be set on the cradle 130. The extending features 154 can be integral tabs formed on the bottom surface 152, or the bottom surface 152 can have a number of holes for receiving inserted pins for the extending features 154. As discussed later, other configurations can be used for adjustably setting the saddles 150 in particular placements on the base 140.

On the extreme ends of the base 140, the cradle 130 has end walls 146. In arrangements disclosed herein, spacer elements (not shown), which are discussed in detail below, can fit in the space between the end walls 146 and the saddles 150 to prevent movement of the saddles 150 outward as the cradle surfaces 160 hold the weight of the supported tower section. Such spacer elements can be used in combination with (or instead of) the extending pins 154 and apertures 144 shown here. As disclosed in more detail below, the spacer elements can include bars, plates, blocks, or the like of configured lengths to fit the adjusted positions of the saddles 150 relative to the end walls 146.

Looking next at the adjustable foot 130', FIGS. 9A-9E illustrate various views of a foot 130' of the disclosed modular assembly. The foot 130' is similar to the cradle 130 and has many of the same components so like reference numerals are used. The foot 130' has slots 142 or cutouts on its base 140 that slide over corresponding inner clips (122) on the bed (112) of the flatcar (110). The slots 142 can be reinforced as shown. The engagement between the slots 142 and the inner clips (122) restrain the foot 130' in the longitudinal and lateral planes.

Figure 10A:
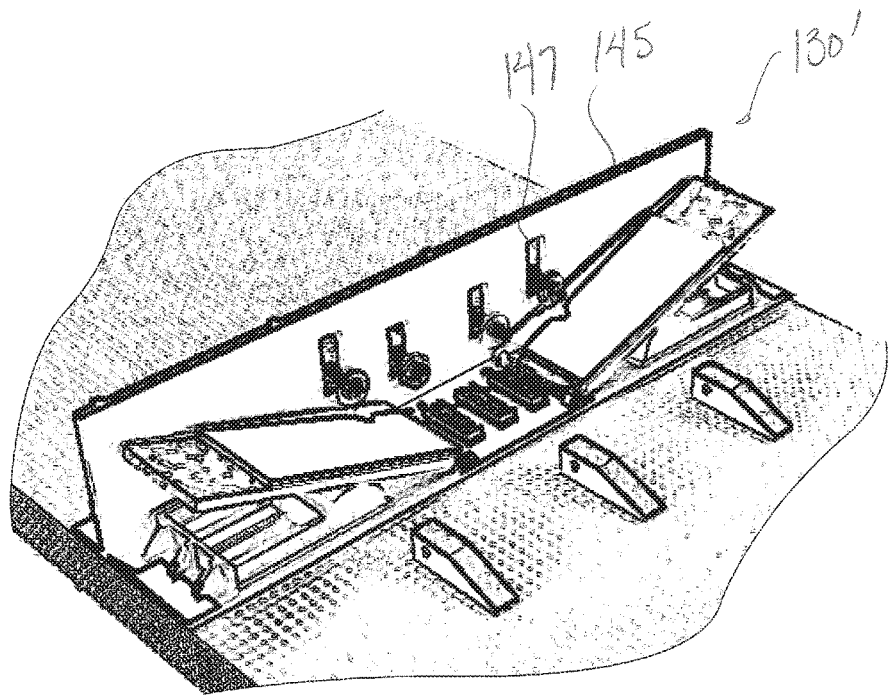
FIGS. 10A-10B illustrate perspective views of opposing sides of a foot disposed relative to tabs on the bed of a flatcar.
Figure 10B:
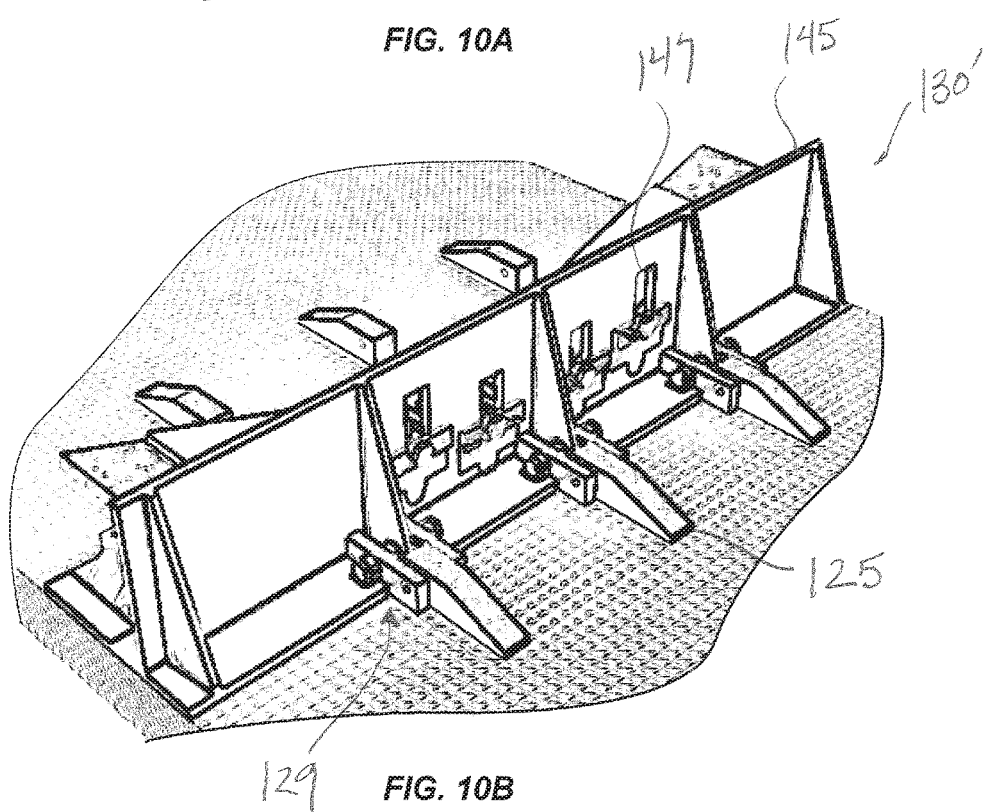

In addition to engaging the inner clips (122), the foot 130' can be affixed in locations to the outer clips (125). This affixing of the foot 130' to the outer clips (125) may be responsible for restraining the vertical force component required by transportation requirements; however, they may add additional reinforcement for the other required restraint vectors. As best shown in FIGS. 9A-9B, for example, the base 140 of the foot 130' extends beyond the sidewall 145 to accommodate supporting features. Hinge hole and slot arrangements 149 on the base 140 are used to affix the base 140 of the foot 130' to the outer clips (125) disposed on the flatcar's bed (112), as shown in FIG. 10B, using hinge pin and spacer arrangements.

The foot's base 140, which is shown in isolated views of FIGS. 11A-11B, has a sidewall or flange 145 extending therefrom. The sidewall 145 has a number of slots 147 for affixing with bolts to the bolt holes arranged on the end of a tower section (not shown). The size and placement of the slots 147 allow for the sidewall 145 to affix to different sized tower sections. To accommodate varying bolt hole positions in the tower section (not shown), for example, the sidewall 145 can have four cutouts 147 that allow bolts to run through the bolt holes in the tower sections. Load bearing plates (not shown) can be used on both sides of the sidewall 145 and the tower's flange to adapt the fixture between the cutouts and bolt holes. (FIGS. 10A-10B illustrates some example components of these features.)

Again, the foot 130' is similar to the cradle 130 and holds the weight of the tower section. Bolting to the sidewall 145 is used to restrain primarily the longitudinal load, but also to a lesser extent the lateral and vertical loads. In one example, the end of the tower section secures to the sidewall 145 with four grade "8" tool steel bolts that are prevented from backing out using grade "8" tool steel sheer plates. To increase the restraint, the tower section can be strapped down to the foot 130'. The combination of adjustable angle of the surfaces 160 and the different bolt securement positions enables the disclosed foot 130' to handle a number of tower diameters, tower lengths, bolt-hole sizes, and bolt-hole arrangements.

As noted above, tabs 154 on the saddles 150 can fit in apertures 144 in the base, and/or spacer elements can fit in the space between the end walls 146 and the saddles 150 to fix the saddles 150 and prevent movement outward as the cradle surfaces 160 hold the weight of the supported tower section. The spacer elements can be a large block, bar, rod, plate, or the like used to hold the saddle 150 in place.

Figure 12A:
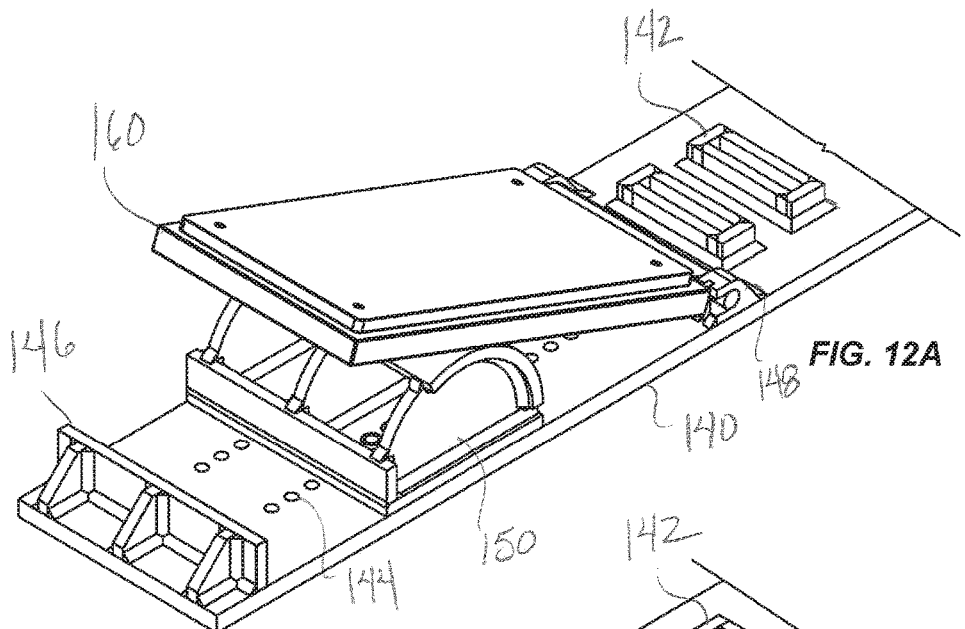
FIGS. 12A-12C illustrate three spacer arrangements according to the present disclosure for spacing the saddles on the base for the disclosed cradles and feet.
Figure 12B:
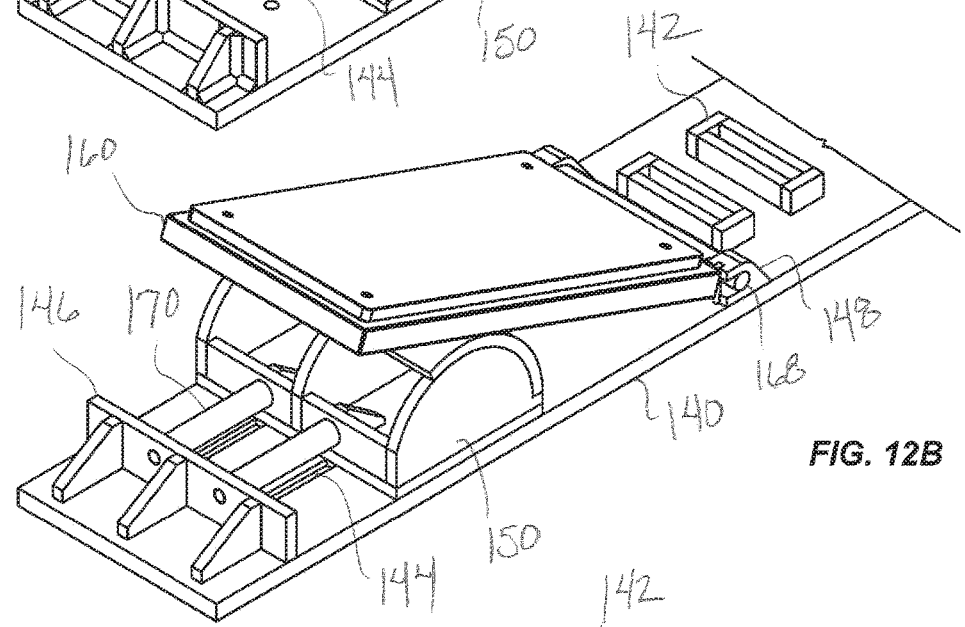
Figure 12C:
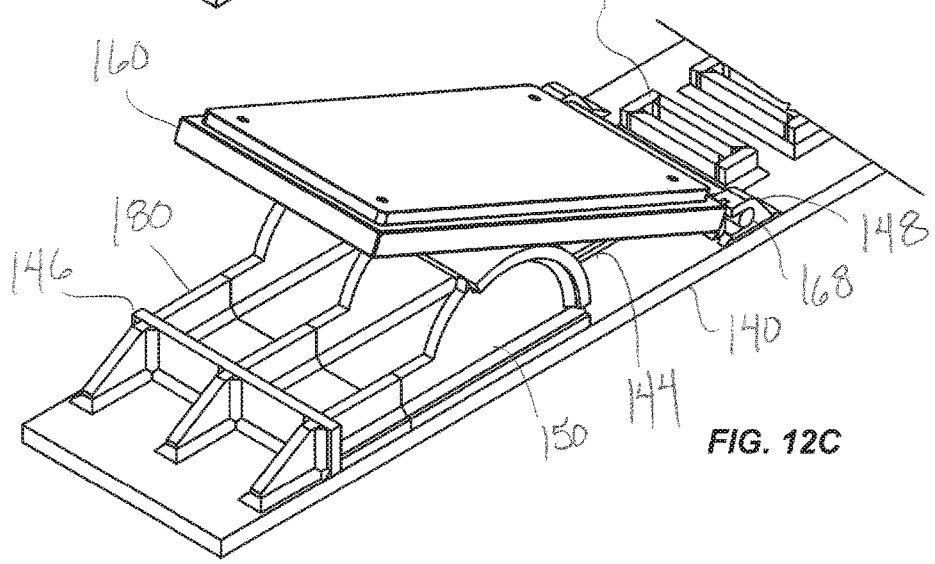

For example, FIGS. 12A-12C illustrate three arrangements according to the present disclosure for spacing the saddles 150 on the base 140 for the disclosed cradles 130 and feet 130'. In general, the base 140 has an edge, stop, or endwall 146 opposite to the hinges 148. One or more spacers (e.g., 170, 180) can be positioned between the edge 146 and the saddle 150 to hold the saddle 150 in position on the base 140. Various spacers e.g., 170, 180) of different lengths can be provided for adjusting the position of the saddle 150 on the base 140.

FIG. 12A shows the previously discussed arrangement in which tabs (154) on the saddle 150 adjustably position in apertures 144 in the base 140 to hold the saddle 150 in a set position. A reverse arrangement of tabs and apertures could be used so that the saddle 150 includes apertures and the base 140 in includes extending tabs.

Instead of the arrangement in FIG. 12A or used in conjunction therewith, FIG. 12B shows a first spacer arrangement for spacing the saddles 150 on the base 140 for the disclosed cradles 130 and feet 130'. In this first arrangement, spacer elements 170 in the form of bars fit in the space between the endwall 146 and the saddle 150.

Instead of the arrangement in FIG. 12A or used in conjunction therewith, FIG. 12C shows a second spacer arrangement for spacing the saddles 150 on the base 140 for the disclosed cradles 130 and feet 130'. In this second arrangement, spacer elements 180 in the form of a block or plate fits in the space between the endwall 146 and the saddle 150.

In each of these arrangements, the cradle surface 160 can receive the majority of the vertical load, while the saddles' tabs 158 (if present) and/or the spacer elements 170/180 (if present) absorb the lateral forces caused by the angled cradle surfaces 160. To change the angle of the cradle surfaces 160, the tab/aperture arrangement and/or the spacer elements 170/180 for the saddle 150 can be changed. The saddle 150 is moved to different apertures 144, and/or the spacer element 170/180 can be changed out for a different length element. The different spacer elements 170/180 can be color coded for ease of use in the field. If apertures 144 and tabs 154 are not used, then the bottom of the saddle 150 and the surface of the base 140 can uses a configuration of longitudinal or lateral rails and tracks for the slots 144.

Although only one end is shown herein in FIGS. 12A-12C, the other end of the base 140 can be similarly configured. Once the saddles 150 are in place, gravity forces the cradle surfaces 160 down onto the saddles 150, which push out toward the endwalls 146. Once the system 100 is set up, there are no moving parts because all of the components are essentially held in place by their own weight and that of the load from the supported tower section.

FIG. 13 illustrates perspective, side, and end views of first spacer elements 170 for the saddle (150) on the base (140) of a cradle 130 or a foot 130'. Again, this first spacer element 170 is a bar 172 having tabs 174 on its ends. The bar 172 can have a particular length to space out the saddle (150) a particular distance on the base (140). A number of such bars 172 are formed in predetermined increments to adjust the angle of the cradle surfaces 160 to the required angle for the given tower diameter.

For example, FIGS. 14A-14B illustrate side and end views of a portion of a cradle 130 with bars 172 of a first length. Preferably, more than one bar 172 is used as shown. The tab 174 of the bar 172 fits in an aperture or slot in the endwall 146 of the base 140. The other tab 174 of the bar 172 fits in an aperture or slot in the saddle 150. The length of the bar 172 can then keep the saddle 150 a set distance from the endwall 146. This in turn places the cradle surface 160 at a given angle for a given radius $R_1$.

For comparison, FIG. 15 illustrates a side view of the portion of the cradle 130 with second bars 172 of a greater length. The saddle 150 is supported closer to the hinge 148 so the cradle surface 160 is at a greater incline for a smaller radius $R_2$, such as would support a tower section of smaller circumference.

Figures 16A, 16B:
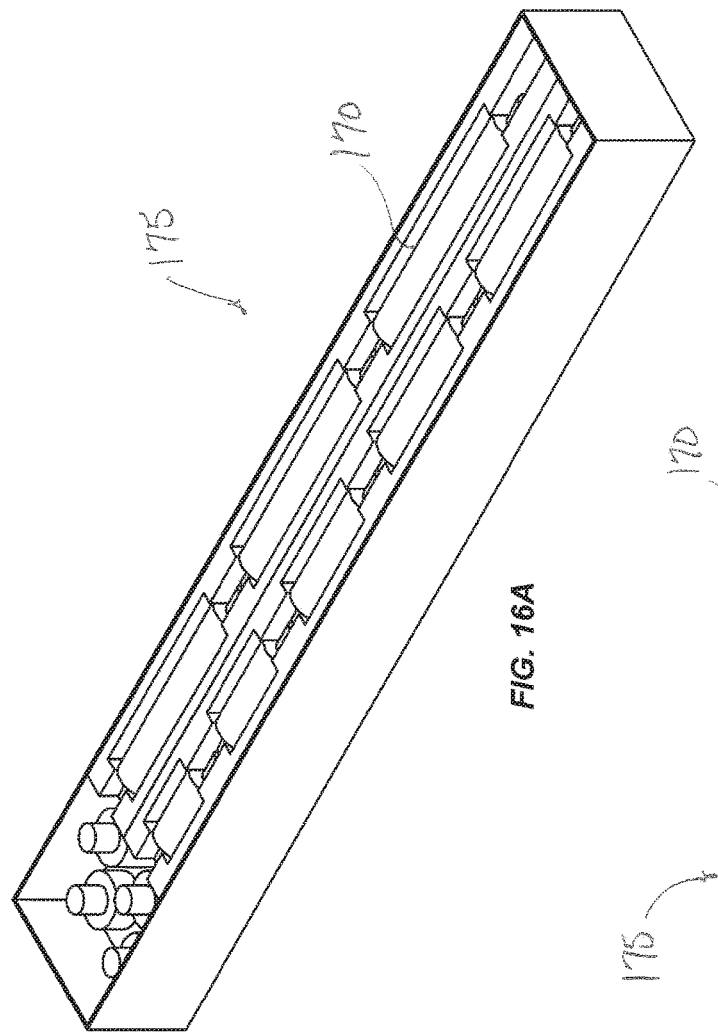
FIGS. 16A-16B illustrate a container holding various spacers for the modular assembly.

Because the assembly 100 of the present disclosure is modular and can be assembled as needed for the various tapers, sizes, circumferences, lengths, and the like of the tower sections, several spacer elements 170 such as the bars 172 may be provided. FIGS. 16A-6B illustrate a container 175 holding various spacer bars 172 for the modular assembly. Several such containers 175 may be held of the flatcar (110) or stored separately so that the correct length bars 172 can be selected and used on the cradles (130) and feet (130').

The container 175 can have a pair of each pin size, and one container 175 can be used one each corner of the railcar (110) to carry pins 170 to set the foot 130' and cradle 130. The length of the pins 172 can coming in 1" increments from 1" to 10", and the diameter of the pins 172 can be 2" along load bearing length. The tabs 174 on the ends can be 1" long and have 1" diameter to secure the pin 172 in place. Other configurations could be used.

Figure 17:
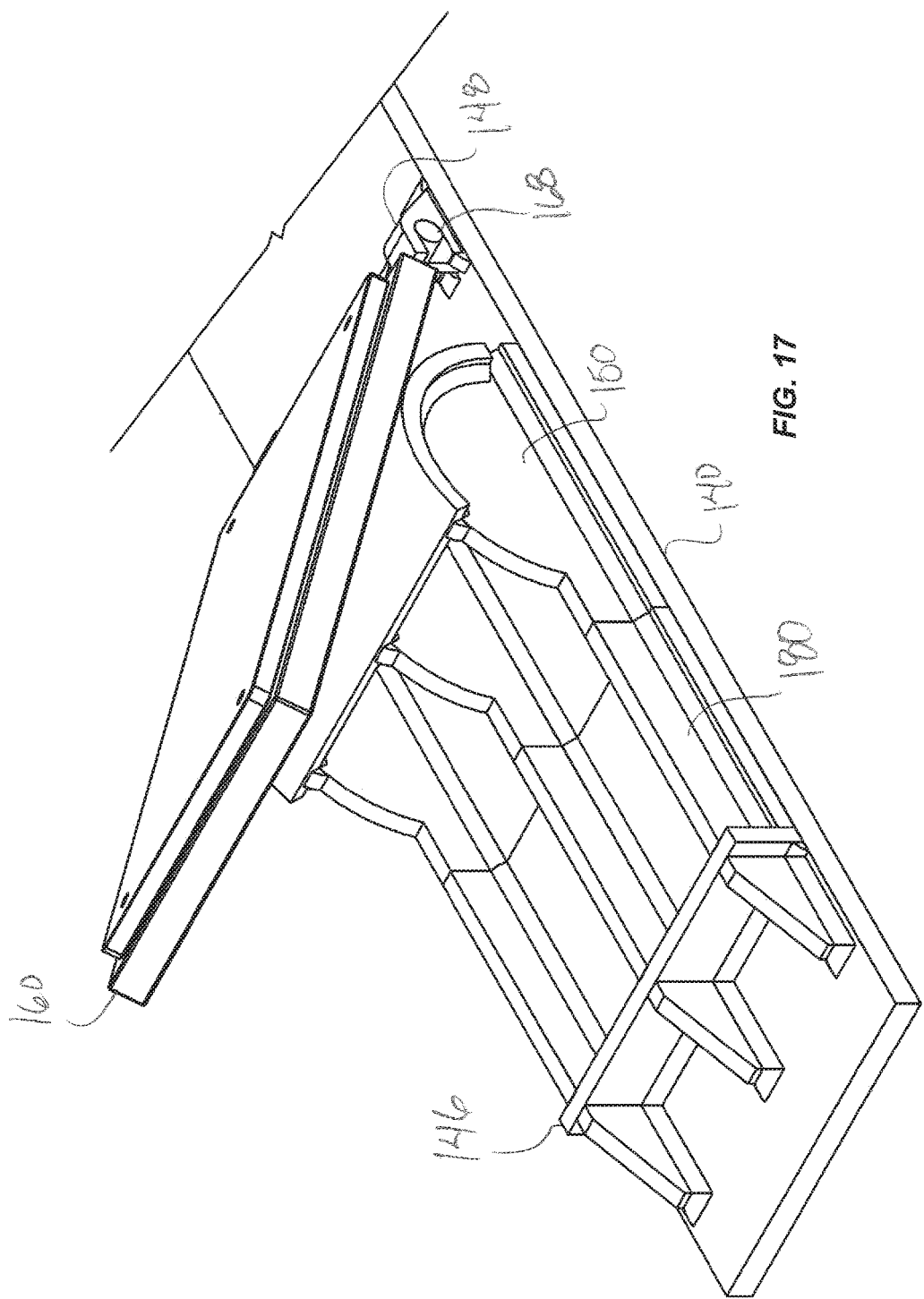
FIG. 17 illustrates a perspective view of a portion of a cradle with another type of spacer for the saddle.

For further illustration, FIG. 17 shows a perspective view of a portion of a cradle 130 with another type of spacer element 180 for the saddle 150. In this example, the spacer element 180 is a plate or block 182 that fits between the endwall 146 and the saddle 150. Tabs, lips, or the like (not shown) can be used to hold the plate 182 in place against the endwall 146 and the saddle 150. As will be appreciated with the benefit of the bar 172 of FIGS. 12B-12C and plate 180 of FIG. 17, the spacer elements for the cradle 130 and foot 130' can have a number of different configurations.

Figure 18D:
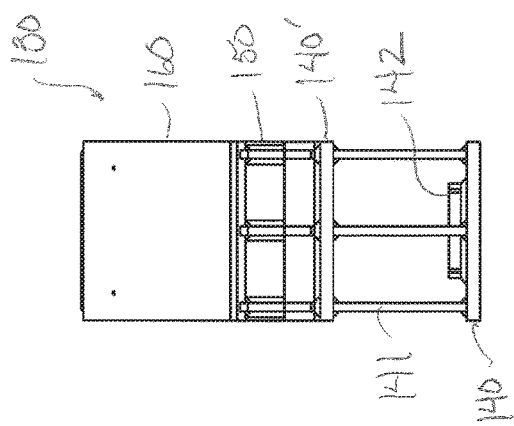
Figure 18B:
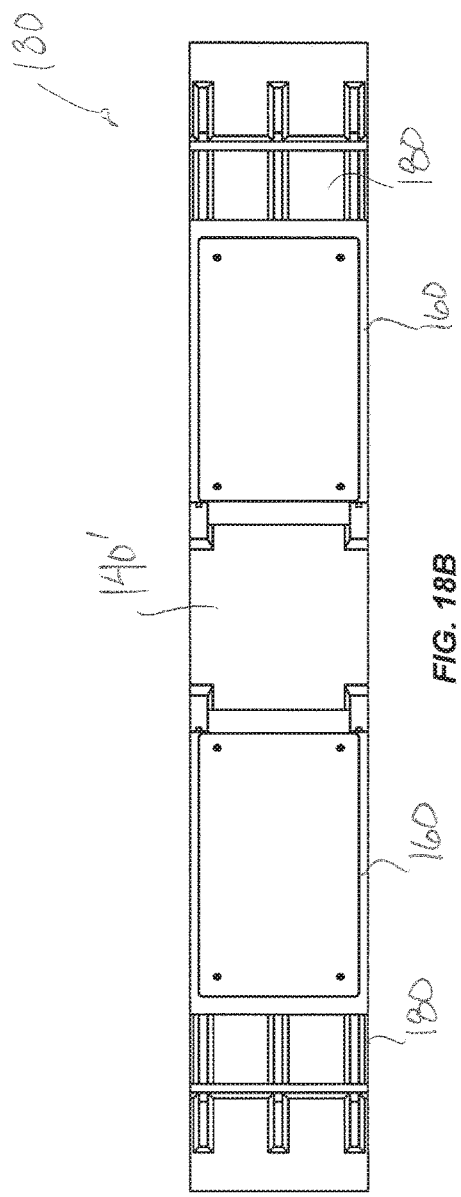
Figure 18C:
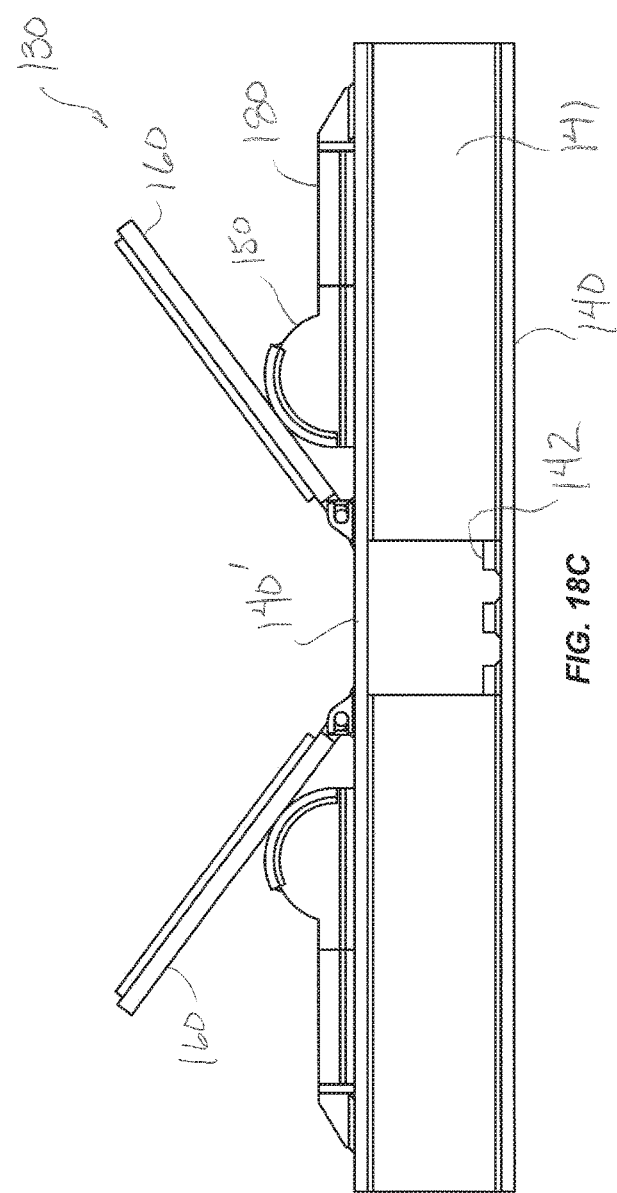

To accommodate reduced diameters of the taper of the tower section, the adjustable cradles 130 and feet 130' for the modular assembly 100 can be used with lifting platforms or can be preconfigured with lifted bases. For example, FIGS. 18A-18B illustrate perspective, plan, side, and end views of an elevated cradle 130 of the disclosed modular assembly 100. An elevated foot 130' can be similarly configured.

A lower base 140 rests against the flatcar's bed (112) and has the slots 142 for the inner clips (122). An upper base 140' is elevated from the lower base 140 by stands 141. The upper base 140' has the other elements of the cradle 130, such as the saddles 150, cradle surfaces 160, spacer elements 180, etc. The stands 141 as shown here can be permanently affixed between the bases 140/140' so that this cradle 130 is preconfigured as elevated. Also, the stands 141 can be separately affixable between the bases 140/140' using bolting and the like so that even the elevation of the cradle 130 and foot 130' can be modularly adjustable.

Figure 19:
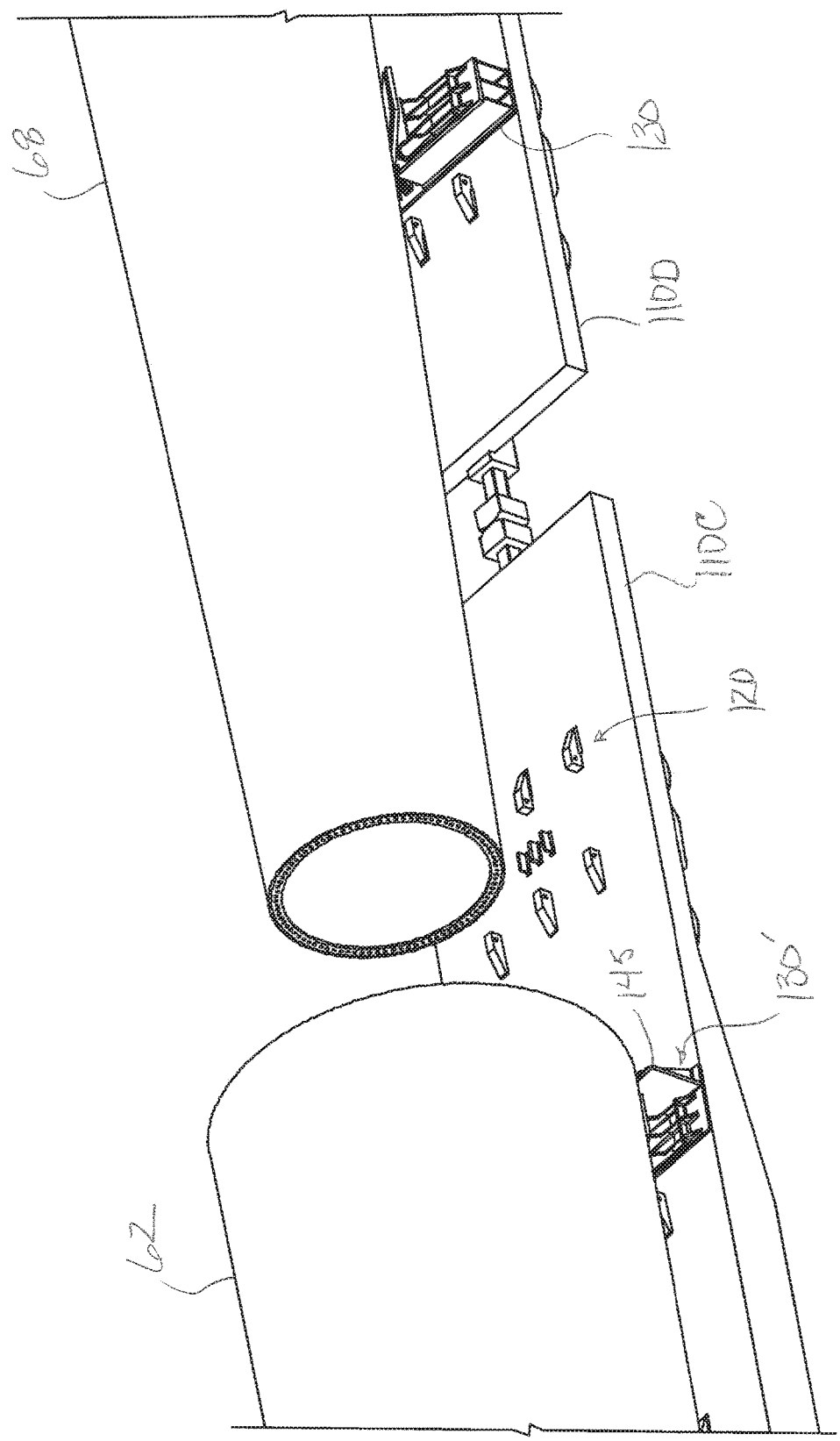
FIG. 19 illustrates the elevated cradle on a flatcar supporting a tower section.

FIG. 19 illustrates how the elevated cradle 130' can be used on a flatcar 110 to support a tower section with a smaller diameter. Although not expressly shown, an elevated foot 130' could be comparably configured like the elevated cradle 130. The elevated cradle 130 accommodates the large change in diameter at the narrow end of the tower section so that cradle's cradle surfaces 160 do not need to be raised to high angles that, why mathematically possible, may not be practical for most applications.

The teachings of the present disclosure facilitate the transportation of large towers and tower sections used in conjunction with wind turbines. The term "tower," "tower section," and the like may be generally interchangeable in the present disclosure.

The modular system 100 uses mounting fixtures that include adjustable cradles 130, adjustable feet 130', and preconfigured support locations 120/120' that can accommodate various tower dimensions and arrangements. The cradles 130, feet 130', and the like can be reusable on the same or other transport devices or railcars to transport other tower sections or the like. The reusable cradles 130 and feet 130' do not require welding and cutting on railcar beds, which reduces the time to load tower sections on the railcars.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

Various details of loads, materials, strengths, forces, and the like are omitted in the description, but would be appreciated by one skilled in the art having the benefit of the present disclosure. Although expressly described for use with tower sections, the assembly 100 can be used to transport any type of cylindrical items, including drums, pipes, stacks, etc.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A system for transporting a plurality of tower sections of a wind turbine, the system comprising:
   a plurality of transport devices each having a bed and each accommodating at least one of the tower sections thereon;
   a plurality of support locations disposed on the beds of the transport devices; and
   a plurality of support members each selectively positionable at one of the support locations and being adjustable to support the tower sections on the beds of the transport devices, each of the support members having an adjustable cradle being movable on the each support member between a plurality of circumferential dimensions against which the tower section rests,
   wherein each of the support locations comprises one or more tabs disposed on the bed of the transport device and restraining the support member positionable thereon at least laterally and longitudinally on the bed, and
   wherein the one or more tabs comprise one or more outer tabs extending from the bed of the transport device and positionable adjacent the support member positionable on the bed at the support location.

2. The system of claim 1, wherein each of the transport devices is selected from the group consisting of a railroad car, a flatcar, a vessel, a ship, a tug, a barge, a truck, a trailer, a pallet, and a shipping container.

3. The system of claim 1, wherein the bed of each transport device comprises at least two of the support locations disposed towards opposite ends of the bed.

4. The system of claim 1, wherein the support locations are the same as one another other.

5. The system of claim 1, wherein the one or more tabs comprise one or more inner tabs extending from the bed of the transport device and positionable in one or more slots of the support member positionable on the bed at the support location.

6. The system of claim 1, wherein at least one of the one or more outer tabs affixes to at least one of the support members.

7. The system of claim 1, wherein at least one of the support members on each of the transport devices comprises a flange affixable to an end of the tower section supported on the bed of the transport device.

8. The system of claim 1, wherein each of the support members comprises:
   a hinge positioned adjacent the bed of the transport device and supporting an end of a cradle surface of the adjustable cradle; and
   a saddle positioned between the bed and the cradle surface and being adjustable relative to the hinge to adjust an angle of the cradle surface relative to the bed.

9. The system of claim 8, wherein each of the support members comprises:
   another hinge positioned adjacent the bed of the transport device and supporting another end of another cradle surface; and
   another saddle positioned between the bed and the other cradle surface and being adjustable relative to the other hinge to adjust an opposing angle of the other cradle surface relative to the bed.

10. The system of claim 8, wherein each of the support members comprises a base positioned against the bed of the transport device, the base having the hinge supporting the end of the cradle surface and having the saddle positioned thereon.

11. The system of claim 10, wherein the base comprises a lift supporting the hinge, the cradle surface, and the saddle a height above the bed.

12. The system of claim 10, wherein the base and the saddle comprises a plurality of tabs and slots engageable with one another to hold the saddle in position on the base.

13. The system of claim 10, wherein the base comprises an edge opposite to the hinge, and wherein the support member comprises one or more spacers positionable between the edge and the saddle to hold the saddle in position on the base.

14. The system of claim 13, wherein the one or more spacers comprises a plurality of the spacers of different lengths for adjusting the position of the saddle on the base.

15. A method of transporting a plurality of tower sections of a wind turbine, the method comprising:
positioning a plurality of supports at a plurality of support locations on beds of transport devices to accommodate at least one of the tower sections on each of the transport devices, each of the support locations comprising one or more tabs disposed on the bed of the transport device and restraining the supports positioned thereon at least laterally and longitudinally on the bed, the one or more tabs comprising one or more outer tabs extending from the bed of the transport device and positionable adjacent the support positioned on the bed at the support location;
adjusting a circumferential dimension of a moveable cradle on each of the supports against which the tower section rests; and
supporting each of the tower sections with at least two of the supports by loading the tower sections on the transport devices.

16. The method of claim 15, wherein positioning the plurality of supports comprises affixing a plurality of bed supports on the beds of the transport devices at the plurality of support locations.

17. The method of claim 16, wherein affixing the bed supports comprising affixing the one or more tabs extending from the bed of the transport device at each of the support locations.

18. The method of claim 16, wherein positioning the plurality of supports comprises engaging, on the bed supports, a plurality of cradle supports having the moveable cradles against which the tower sections rest.

19. The method of claim 18, wherein engaging the cradle supports comprises at least one of engaging one or more slots of the cradle supports on the one or more tabs of the bed supports; and restraining the cradle supports at least laterally and longitudinally on the bed with the slots engaged in the one or more tabs.

20. The method of claim 16, wherein positioning the plurality of supports comprises affixing at least one cradle support, having the moveable cradle against which the tower sections rest, on the at least one bed support of each of transport devices.

21. The method of claim 15, further comprising affixing an end of each of the tower sections to a flange on at least one of the supports on each of the transport devices.

22. The method of claim 15, wherein adjusting the circumferential dimension of the adjustable cradle on each of the supports against which the tower section rests comprises:
moving an angle of a cradle surface of the adjustable cradle relative to the bed on a hinge positioned adjacent the bed of the transport device by moving a position of a saddle between the bed and the cradle surface.

23. The method of claim 22, wherein adjusting the circumferential dimension of the adjustable cradle on each of the supports against which the tower section rests comprises:
moving an opposing angle of another cradle surface of the adjustable cradle relative to the bed on another hinge positioned adjacent the bed of the transport device by moving another position of another saddle between the bed and the other cradle surface.

24. The method of claim 22, wherein moving the position of the saddle between the bed and the cradle surface comprises changing the position of the saddle on a base of the support positioned against the bed of the transport device, the base having the hinge supporting the end of the cradle surface and having the saddle positioned thereon.

25. A system for transporting a plurality of tower sections of a wind turbine, the system comprising:
a plurality of transport devices each having a bed and each accommodating at least one of the tower sections thereon;
a plurality of support locations disposed on the beds of the transport devices; and
a plurality of support members each selectively positionable at one of the support locations and being adjustable to support the tower sections on the beds of the transport devices, each of the support members having an adjustable cradle being movable on the each support member between a plurality of circumferential dimensions against which the tower section rests,
wherein each of the support members comprises: a hinge positioned adjacent the bed of the transport device and supporting an end of a cradle surface of the adjustable cradle; and a saddle positioned between the bed and the cradle surface and being adjustable relative to the hinge to adjust an angle of the cradle surface relative to the bed;
wherein each of the support members comprises a base positioned against the bed of the transport device, the base having the hinge supporting the end of the cradle surface and having the saddle positioned thereon; and
wherein the base comprises an edge opposite to the hinge, and wherein the support member comprises one or more spacers positionable between the edge and the saddle to hold the saddle in position on the base.

26. The system of claim 25, wherein each of the transport devices is selected from the group consisting of a railroad car, a flatcar, a vessel, a ship, a tug, a barge, a truck, a trailer, a pallet, and a shipping container.

27. The system of claim 25, wherein the bed of each transport device comprises at least two of the support locations disposed towards opposite ends of the bed.

28. The system of claim 25, wherein at least one of the support members on each of the transport devices comprises a flange affixable to an end of the tower section supported on the bed of the transport device.

29. The system of claim 25, wherein each of the support members comprises:
another hinge positioned adjacent the bed of the transport device and supporting another end of another cradle surface; and
another saddle positioned between the bed and the other cradle surface and being adjustable relative to the other hinge to adjust an opposing angle of the other cradle surface relative to the bed.

30. The system of claim 25, wherein the base and the saddle comprises a plurality of tabs and slots engageable with one another to hold the saddle in position on the base.

31. The system of claim 25, wherein the one or more spacers comprises a plurality of the spacers of different lengths for adjusting the position of the saddle on the base.

* * * * *